Figure 1:
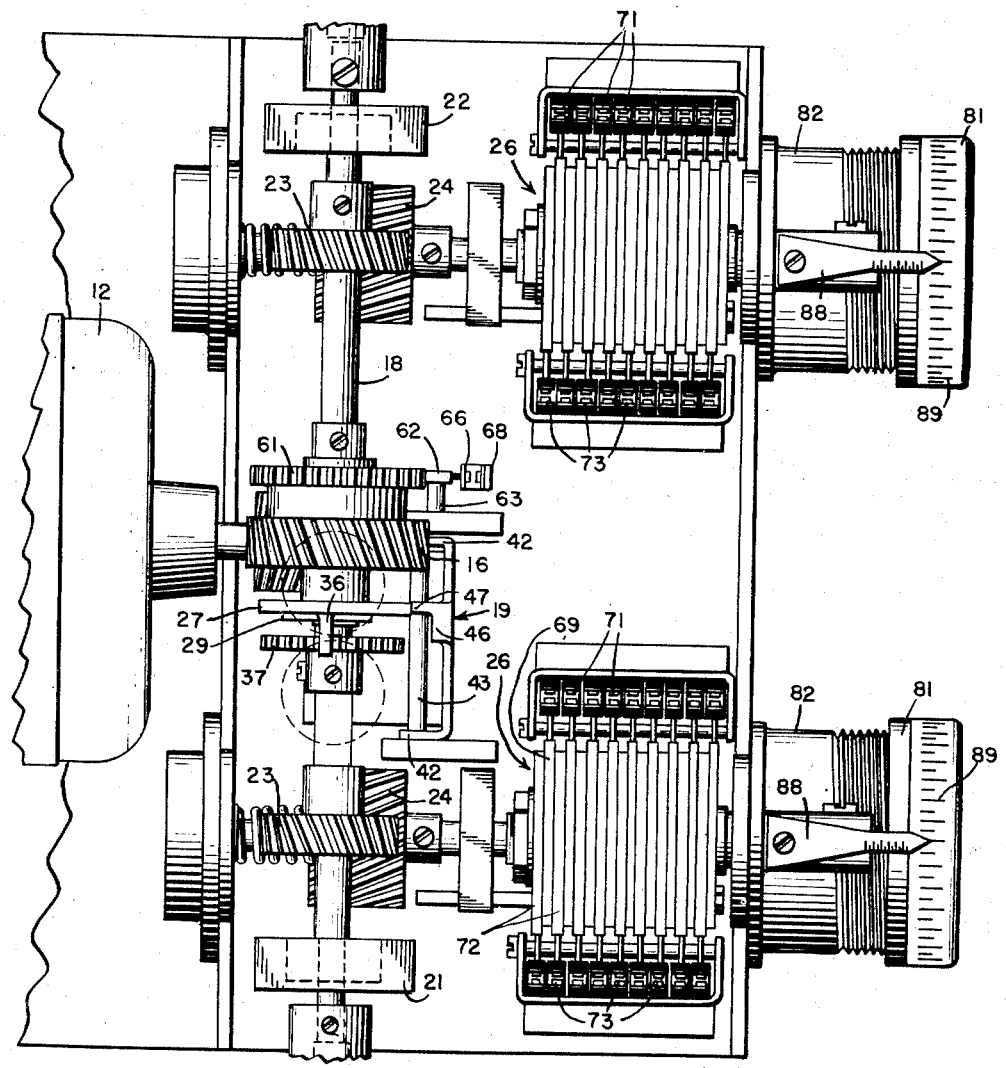

Dec. 25, 1951  L. M. POTTS  2,579,612
TELEGRAPH CONVERTER SYSTEM AND APPARATUS
Filed June 18, 1947  17 Sheets-Sheet 1

INVENTOR
LOUIS M. POTTS, DECEASED
MARTHA W. C. POTTS, EXECUTRIX
BY Emery Robinson
ATTORNEY

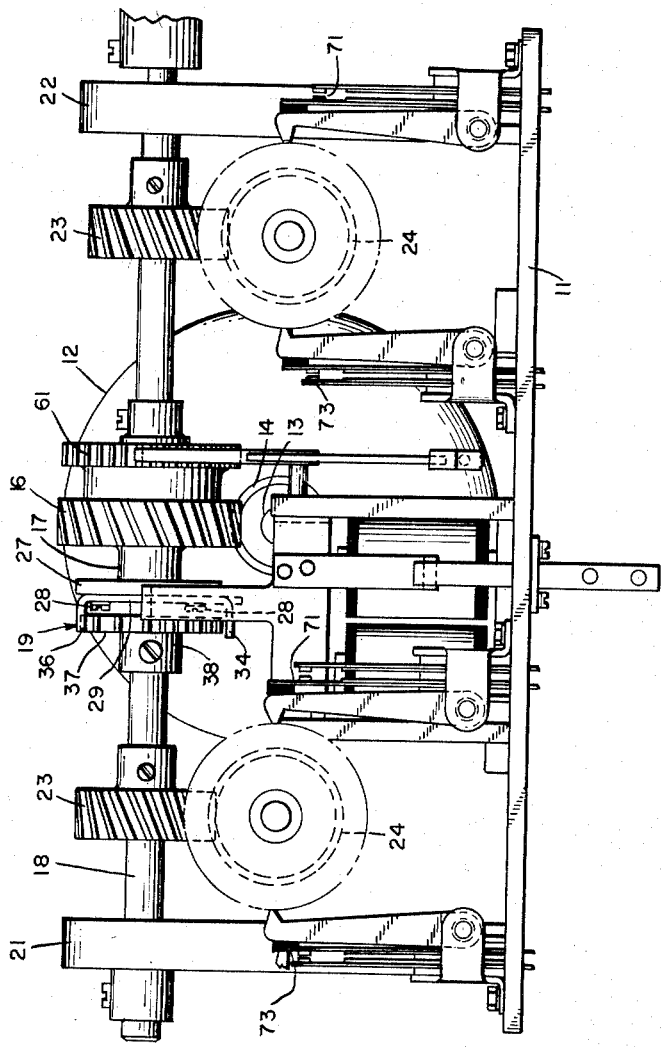

Dec. 25, 1951     L. M. POTTS     2,579,612
TELEGRAPH CONVERTER SYSTEM AND APPARATUS
Filed June 18, 1947     17 Sheets-Sheet 4

INVENTOR
LOUIS M. POTTS, DECEASED
MARTHA W. C. POTTS, EXECUTRIX
BY *Emery Robinson*
ATTORNEY Dec. 25, 1951  L. M. POTTS  2,579,612
TELEGRAPH CONVERTER SYSTEM AND APPARATUS
Filed June 18, 1947  17 Sheets-Sheet 5
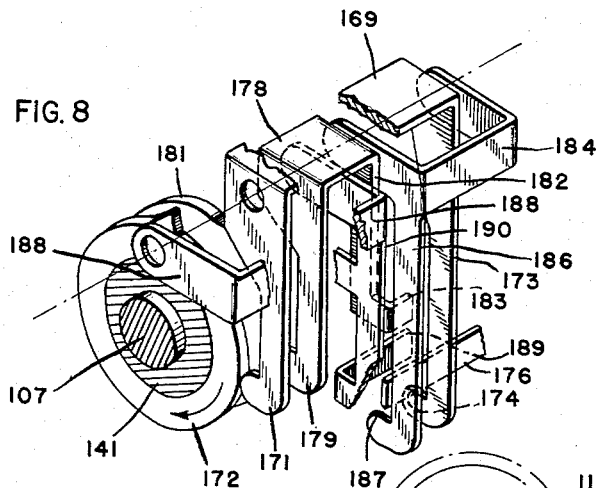
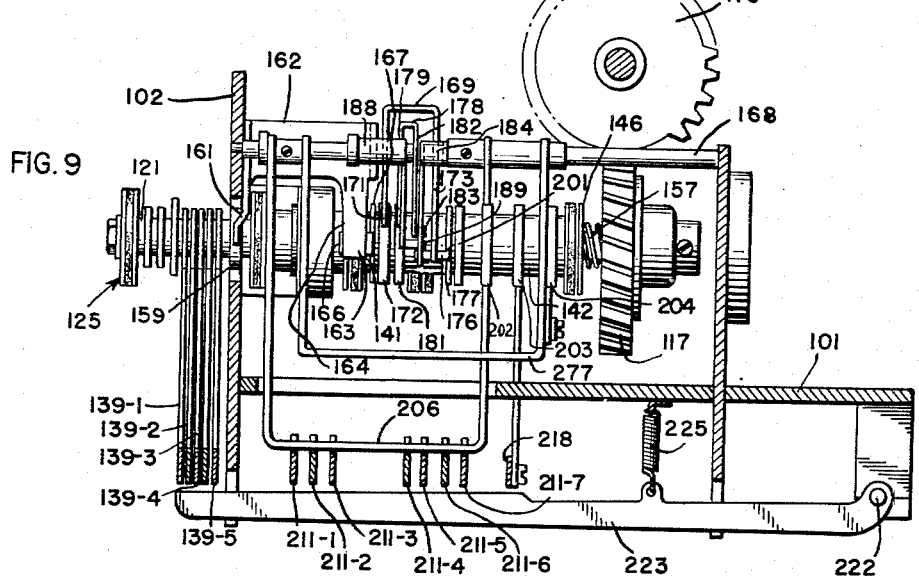
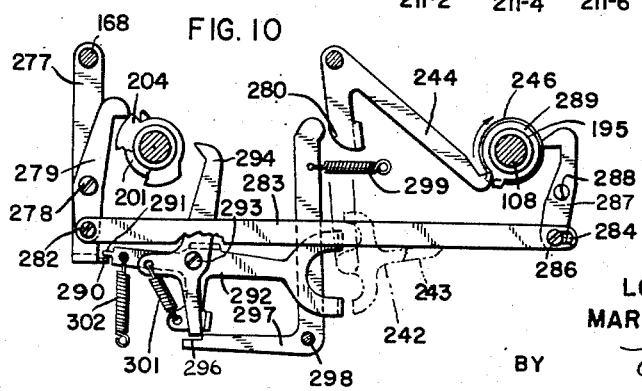
INVENTOR
LOUIS M. POTTS, DECEASED
MARTHA W. C. POTTS, EXECUTRIX
BY
Emery Robinson
ATTORNEY Dec. 25, 1951 L. M. POTTS 2,579,612
TELEGRAPH CONVERTER SYSTEM AND APPARATUS
Filed June 18, 1947 17 Sheets-Sheet 6
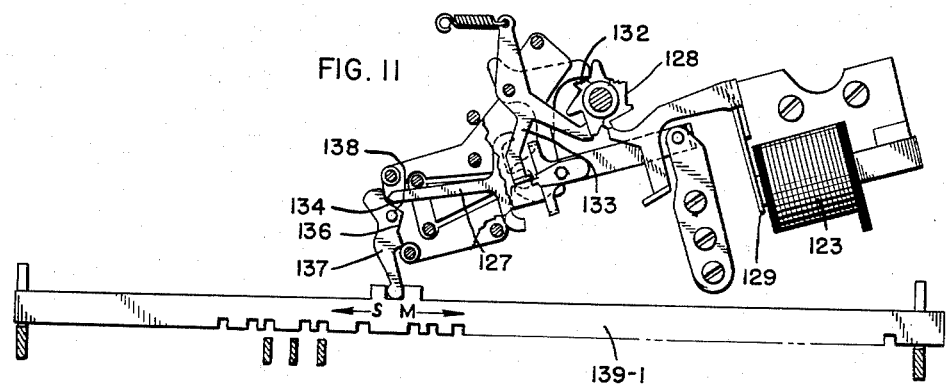
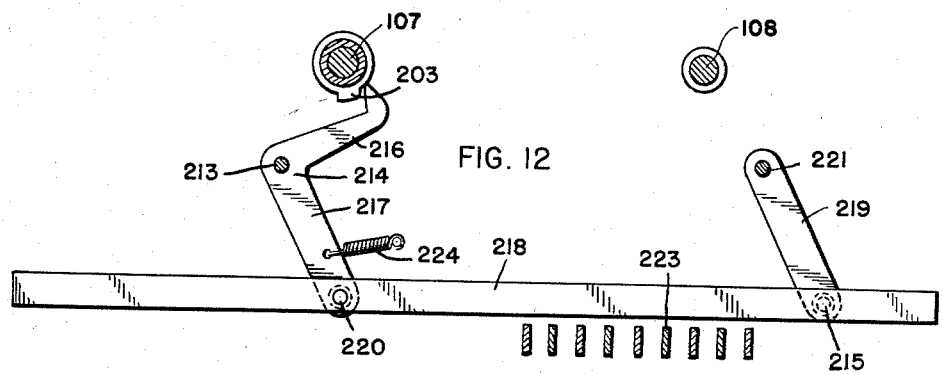
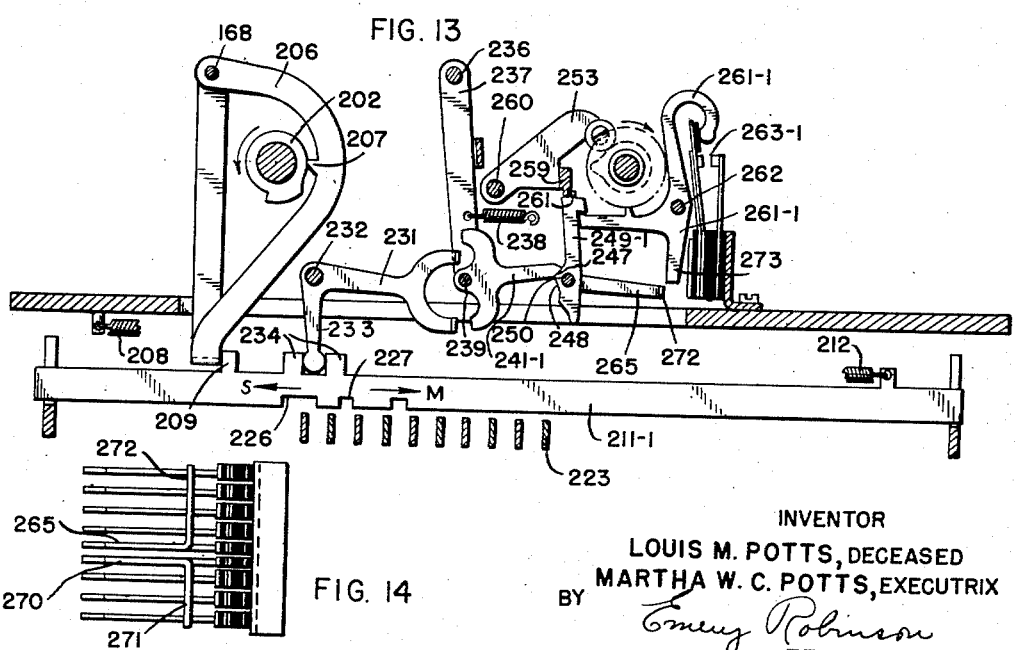
INVENTOR
LOUIS M. POTTS, DECEASED
BY MARTHA W. C. POTTS, EXECUTRIX
Emery Robinson
ATTORNEY Dec. 25, 1951 L. M. POTTS 2,579,612
TELEGRAPH CONVERTER SYSTEM AND APPARATUS
Filed June 18, 1947 17 Sheets-Sheet 8

INVENTOR
LOUIS M. POTTS, DECEASED
MARTHA W. C. POTTS, EXECUTRIX
BY
Emery Robinson
ATTORNEY Dec. 25, 1951  L. M. POTTS  2,579,612
TELEGRAPH CONVERTER SYSTEM AND APPARATUS
Filed June 18, 1947  17 Sheets-Sheet 9
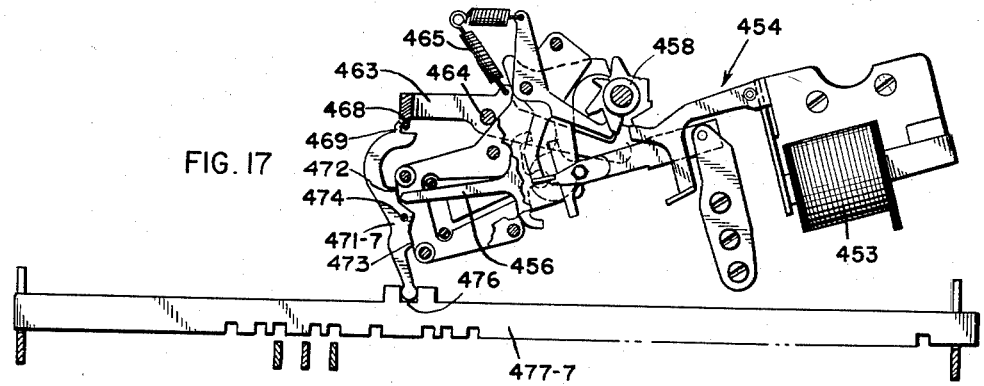
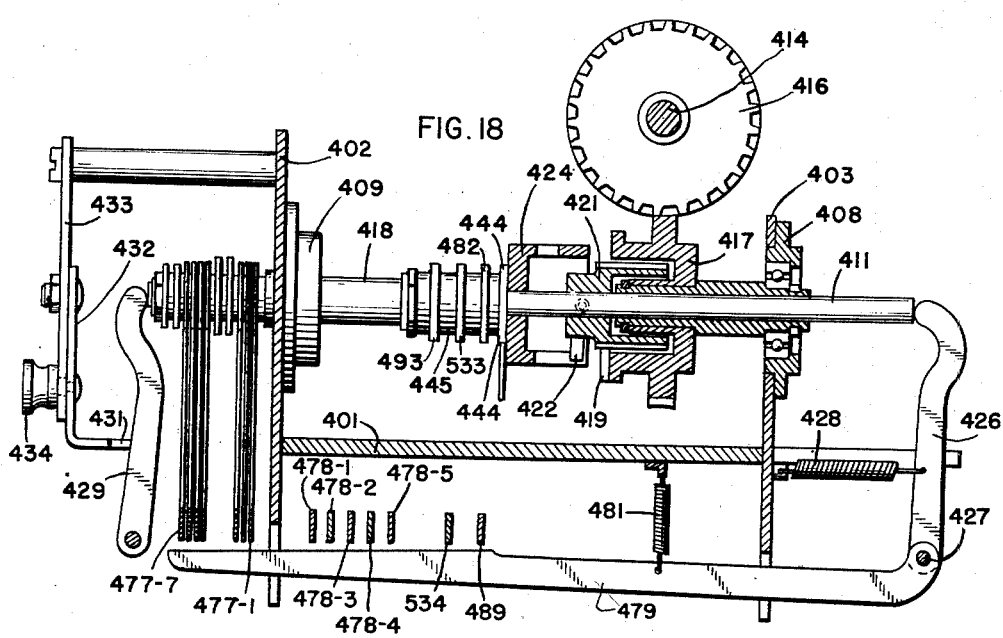
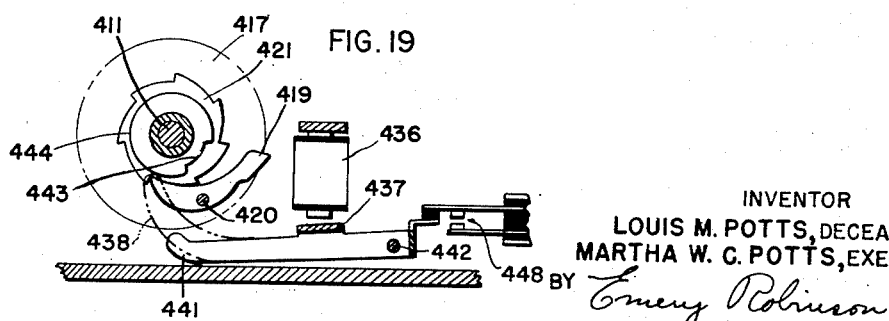
INVENTOR
LOUIS M. POTTS, DECEASED
MARTHA W. C. POTTS, EXECUTRIX
BY Emery Robinson
ATTORNEY Dec. 25, 1951     L. M. POTTS     2,579,612
TELEGRAPH CONVERTER SYSTEM AND APPARATUS
Filed June 18, 1947     17 Sheets-Sheet 10
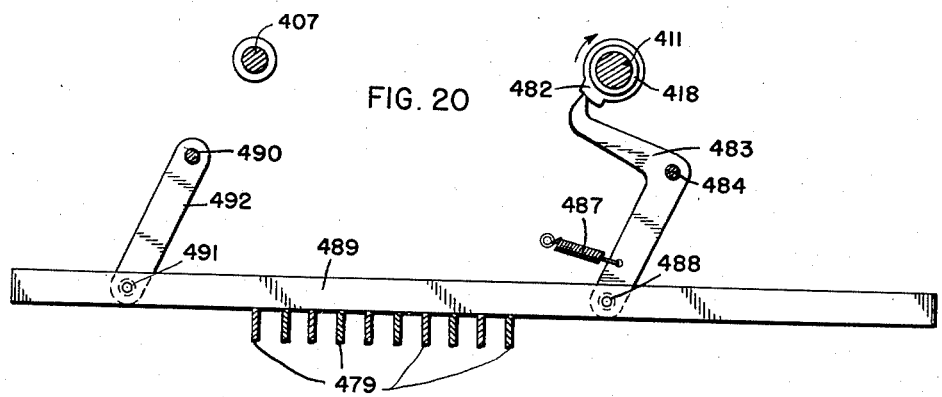
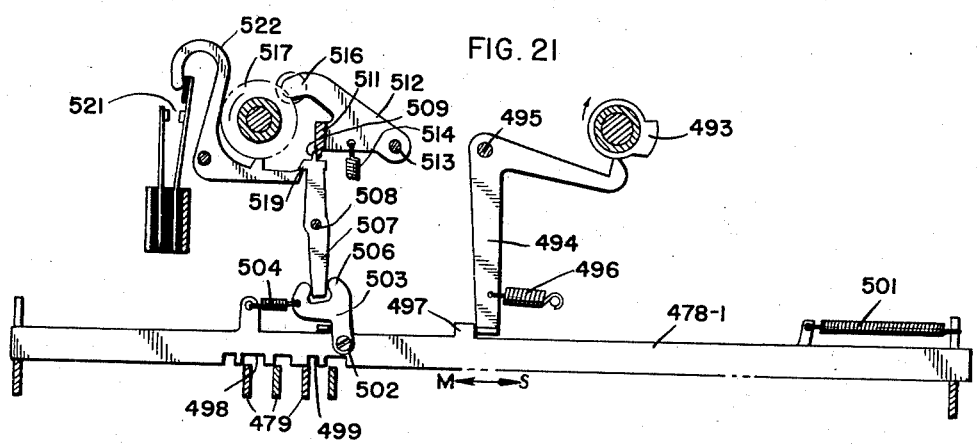
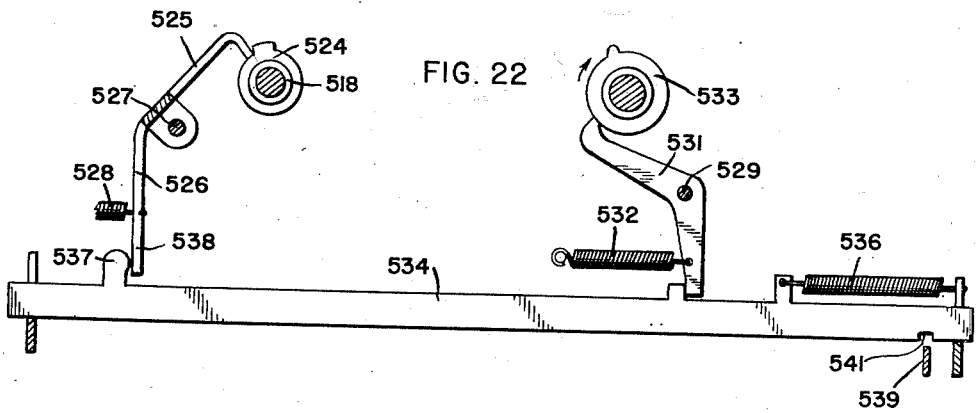
INVENTOR
LOUIS M. POTTS, DECEASED
MARTHA W. C. POTTS, EXECUTRIX
BY
ATTORNEY Dec. 25, 1951   L. M. POTTS   2,579,612
TELEGRAPH CONVERTER SYSTEM AND APPARATUS
Filed June 18, 1947   17 Sheets-Sheet 14

INVENTOR
LOUIS M. POTTS, DECEASED
BY MARTHA W. C. POTTS, EXECUTRIX
Emery Robinson
ATTORNEY

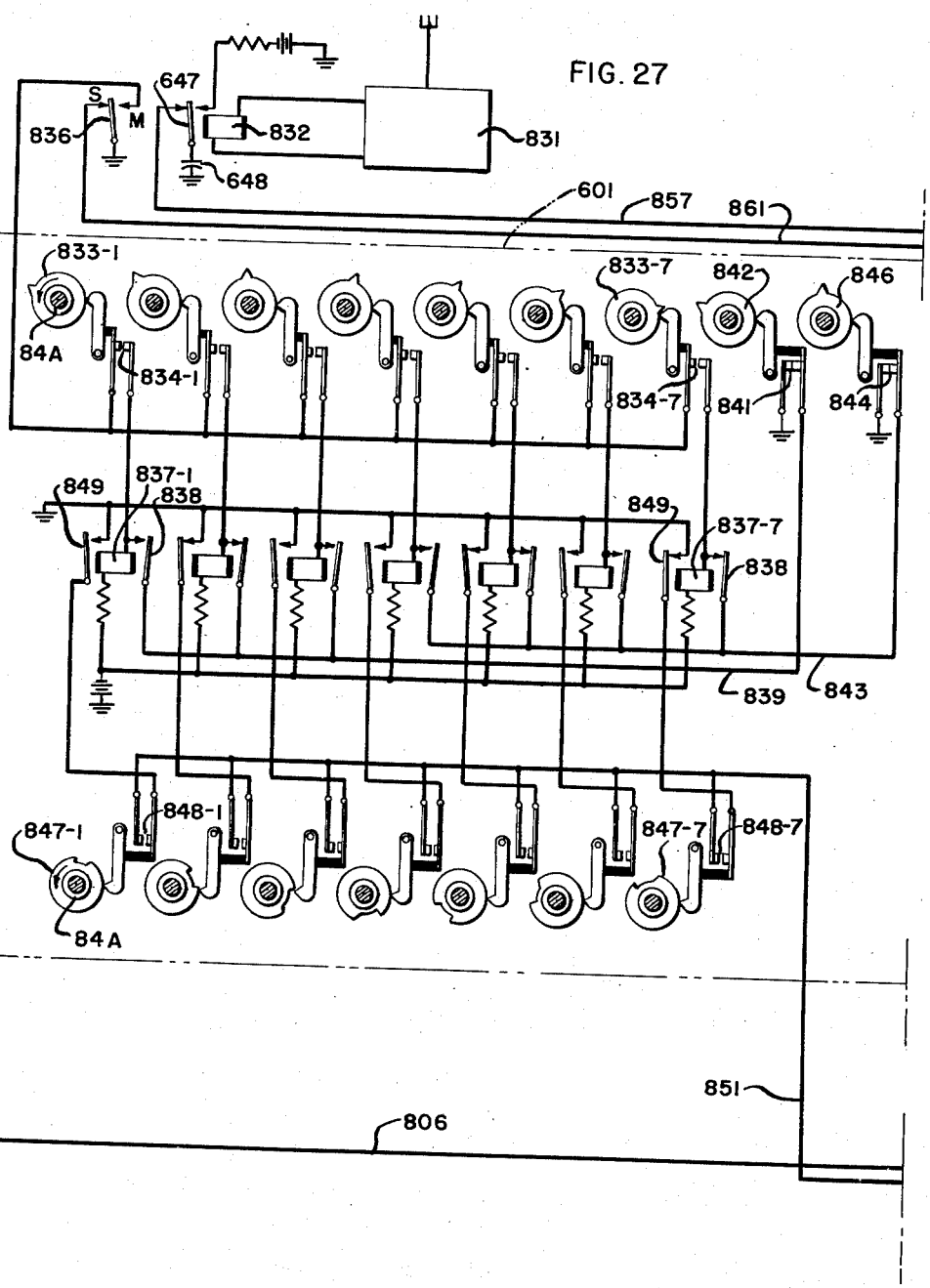

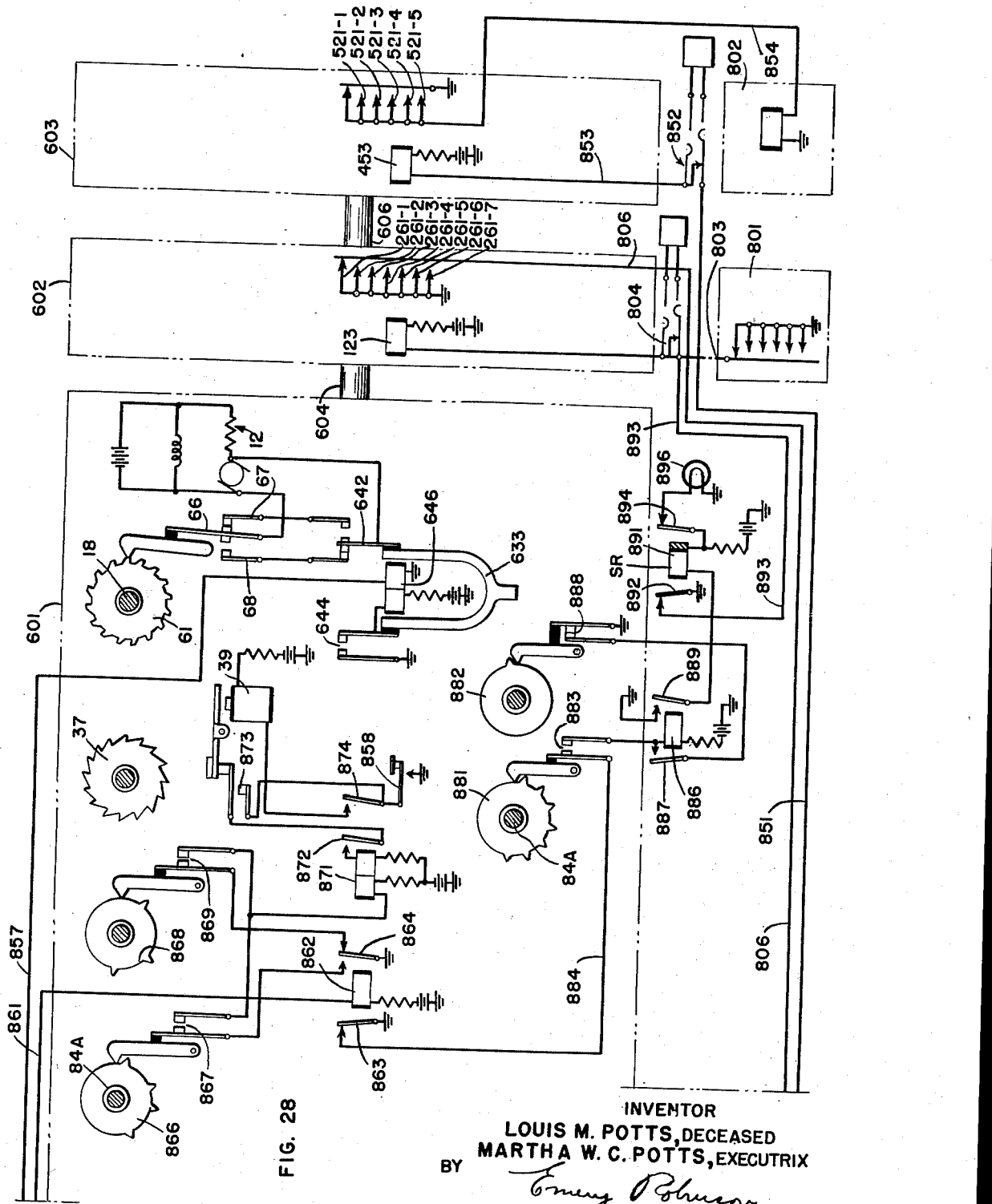

Dec. 25, 1951  L. M. POTTS  2,579,612
TELEGRAPH CONVERTER SYSTEM AND APPARATUS
Filed June 18, 1947  17 Sheets-Sheet 17

INVENTOR
LOUIS M. POTTS, DECEASED
MARTHA W. C. POTTS, EXECUTRIX
BY
ATTORNEY

Patented Dec. 25, 1951

2,579,612

UNITED STATES PATENT OFFICE 2,579,612

TELEGRAPH CONVERTER SYSTEM AND APPARATUS

Louis M. Potts, deceased, late of Evanston, Ill., by Martha W. C. Potts, executrix, Evanston, Ill., assignor to Teletype Corporation, Chicago, Ill., a corporation of Delaware Application June 18, 1947, Serial No. 755,445

11 Claims. (Cl. 178—4)

This invention relates to telegraph converter systems and apparatus wherein signal code combinations of one code are converted into signal code combinations of another code and subsequently reconverted into the original signal code combinations.

An object of the present invention is to provide a complete telegraph conversion system which includes mechanical apparatus for converting signal code combinations of one code into signal code combinations of a different code, and mechanical apparatus for reconverting said signal code combinations of the different code into the original signal code combinations.

A more specific object of the invention is to provide a telegraph conversion system which includes mechanical conversion apparatus for converting five unit start-stop signal code combinations into seven unit radio signal code combinations and mechanical conversion apparatus for reconverting said seven unit radio signal code combination into the original five unit start-stop signal code combinations.

A further object of the invention is to provide a mechanical converter unit for converting five unit start-stop signals into seven unit radio signals.

Another object of the invention is to provide a mechanical converter unit for reconverting seven unit radio signals into five unit start-stop signals.

An aditional object of the invention is to provide a motor unit for driving both converter units mentioned above.

Another object of the invention is to provide various phasing and orienting devices essential to the maintenance of synchronism between apparatus at remotely located telegraph stations.

A further object of the invention is to provide a simplex radio system with which the converter units and motor unit are adapted to be used.

An additional object of the invention is to provide a two channel one way multiplex system in which the groups of signals assigned to one channel are interleaved with the groups of signals assigned to the other channel.

Yet a further, but important, object of the invention is to provide a duplex radio system using a single frequency transmission band.

Further objects and advantages of the invention will appear as the invention is described in detail and restrictions of the scope of the invention should not be implied from the specific recital of the above appearing objects.

According to the present invention, five unit start-stop signals provided by any conventional five unit start-stop transmitter are converted into seven unit radio signals and by means of a radio transmitter are sent to a distant station. At the distant station the seven unit radio signals are received by a radio receiver and reconverted into the original five unit start-stop signals to accordingly operate conventional telegraph recording apparatus. Use of the seven unit radio code with its error detecting feature has proved valuable where transmission of coded messages is required. For example, when coded messages are transmitted in a form such as "ABZ," such a group of letters may stand for a phrase, or even a complete sentence containing several words and receipt of a single incorrect character may render a message unintelligible or give to the message a meaning different than was intended. Each code combination in the seven unit radio code change contains three marking and four spacing impulses. Any deviation in this fixed ratio of the number of marking impulses to the number of spacing impulses causes the printing of an error indication character. A misselection indicator used for such a purpose is shown in the patent of L. M. Potts, No. 2,304,120, dated December 8, 1942. As will become apparent later in the description, in the present invention receipt of an all spacing signals by the five unit start-stop recorder causes the recording of an error indication character.

The invention contemplates the use of three basic mechanical apparatus units, a motor unit, a five to seven unit code conversion unit, and a seven to five unit code conversion unit. The motor unit is used for driving both converter units or a series of such units. The motor unit in addition to driving the converter unit also drives two sets of cams which may control various cam operated contacts according to the particular system in which the motor unit is used. Also included in the motor unit are several phasing and orienting devices which will be taken up later in the description.

The five to seven unit code conversion unit includes a single magnet selector which sets up the positions of a series of five unit code bars. The setting of the five unit code bars selects one of a plurality of character bars which establishes a selection for a series of seven unit code bars. The selection of the seven unit code bars is in turn transferred to a series of seven gooseneck transmitting levers. Idle signals are automatically inserted to compensate for the gain of a seven unit transmitting cam sleeve, which continuously rotates, over a five unit start-stop selector sleeve. It should be mentioned at this time that in the seven unit radio system the idle signal contains marking impulses for the second, fifth and seventh elements of the code combination.

The seven to five unit conversion unit also includes a single magnet selector which sets up the positions of a series of seven unit code bars. The setting of the seven unit code bars selects one of a plurality of character bars, which establishes a selection for a series of five unit code bars. The setting of the five unit code bars is in turn transferred to a series of five gooseneck transmitting levers. When seven unit idle signals are received, the start-stop apparatus is not released so that no character will be printed by the five unit start-stop recorder at this time. If no regular message character or no idle signal character is received, it is an indication that the ratio of three marking impulses to four spacing impulses in the code combination has not been maintained. At this time, the gooseneck transmitting levers will function to send an all spacing signal to the five unit start-stop recording apparatus and in response to the receipt of such a code combination an error indication will be recorded.

In one instance, the invention has been applied to a simplex radio system wherein the direction of transmission may be changed by manual operation of a switch. For maintaining a phase relationship between a transmitting and a receiving station a tuning fork synchronizing arrangement is utilized. A further phasing arrangement included in this system consists of a finder mechanism which operates under the control of idle signals. The simplex radio system utilizes a motor unit, a five to seven unit code converter unit, and a seven to five unit code converter unit, located at each terminal of the system.

The invention has also been applied to a one way, two channel multiplex system using interleaved signals. The transmitting terminal of this system is provided with two five to seven unit converter units while the receiving terminal is provided with two seven to five unit converter units.

A third system contemplated by the invention consists of a duplex radio system using a single frequency transmission band. This system is based on a time division method in which radio signals are transmitted in one direction for approximately one-half of a cycle and are transmitted in the opposite direction for approximately one-half of a cycle. Original signals are provided at opposite stations by any conventional five unit start-stop transmitter and are then converted into a seven unit code by means of a five to seven unit converter unit. The seven unit signals are stored at each station and compressed into approximately one-half of a transmitting cycle for transmission in alternate directions. Thus, while signals may be continuously generated by the seven unit transmitters at opposite stations, the signal code combinations pass over the frequency band on a time division basis. As the seven unit code signals are received, the code combinations are expanded to full cycle signals and are reconverted to five unit start-stop signals to operate conventional five unit start-stop recording apparatus.

Figure 4:
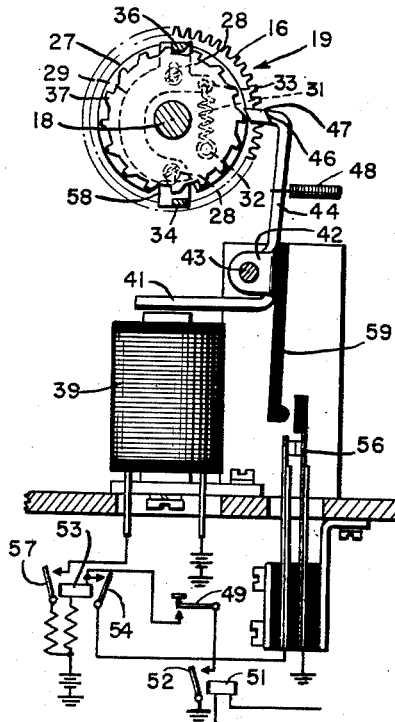
Figure 5:
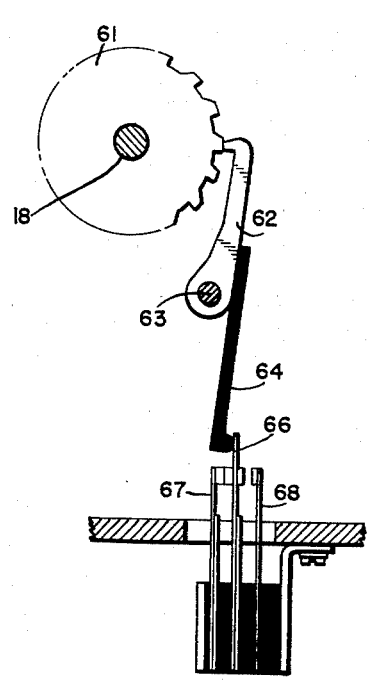
Figure 3:
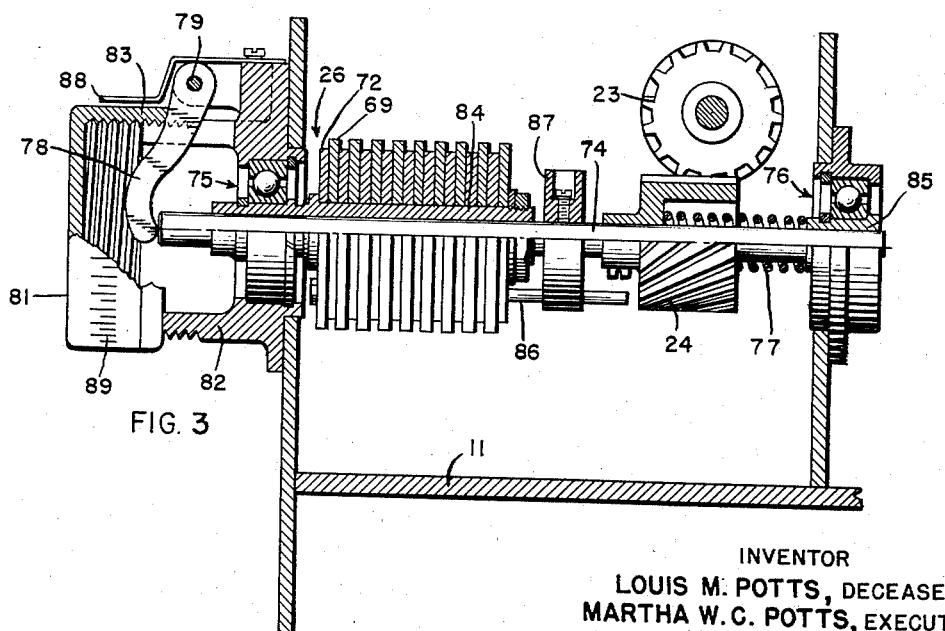
Figures 6, 7:
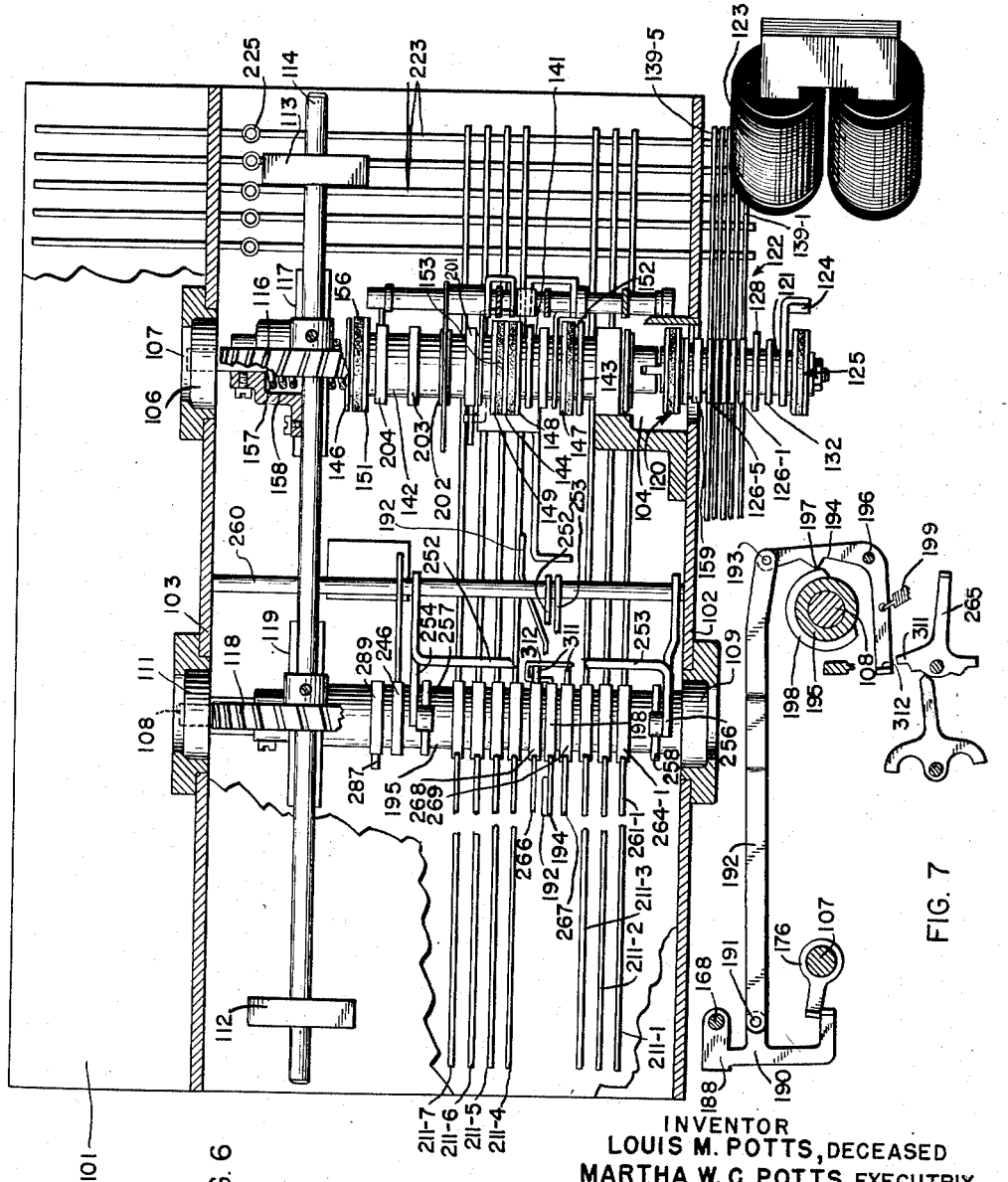
Figure 15:
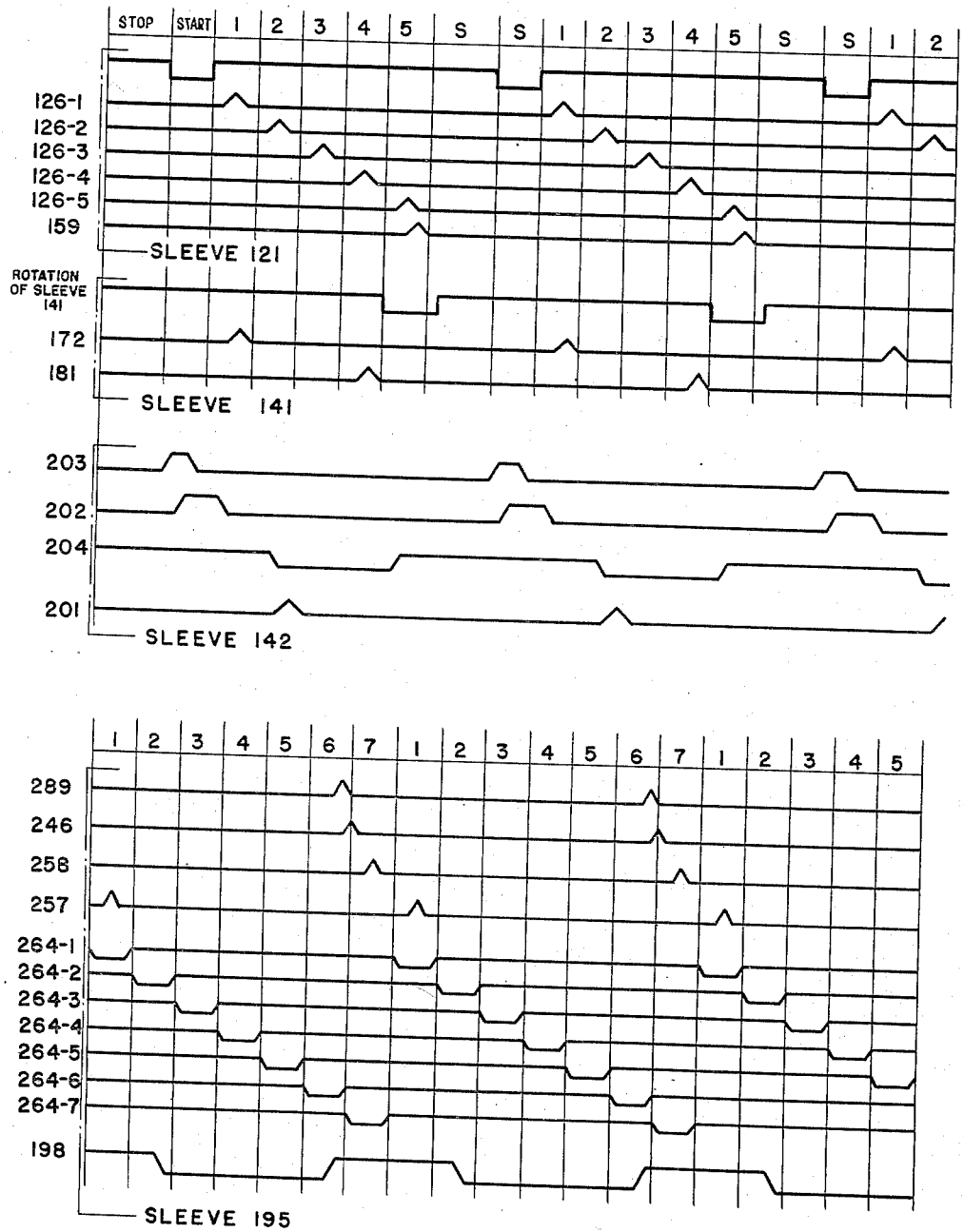
Figure 16:
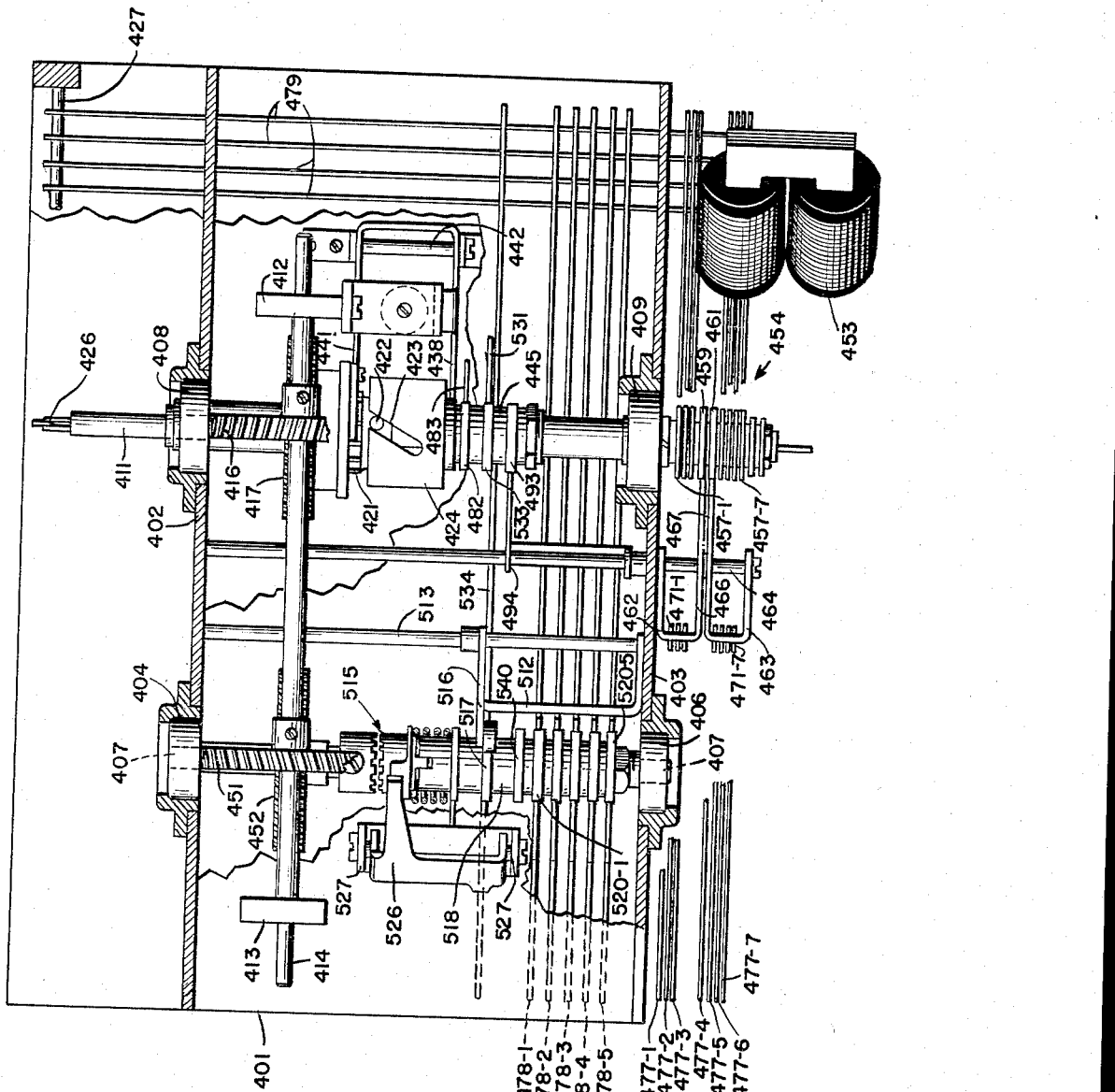
Figure 23:
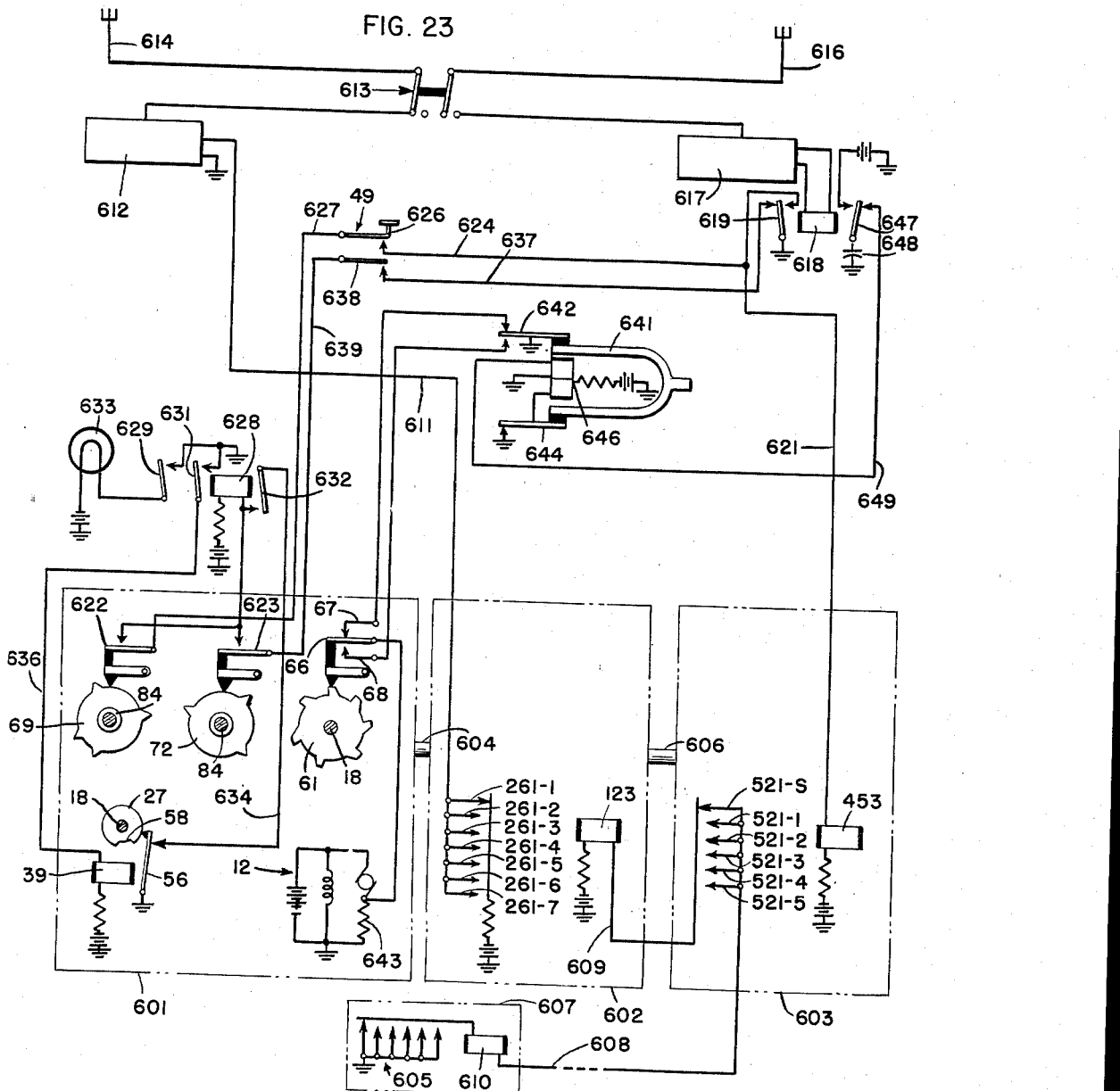
Figure 24:
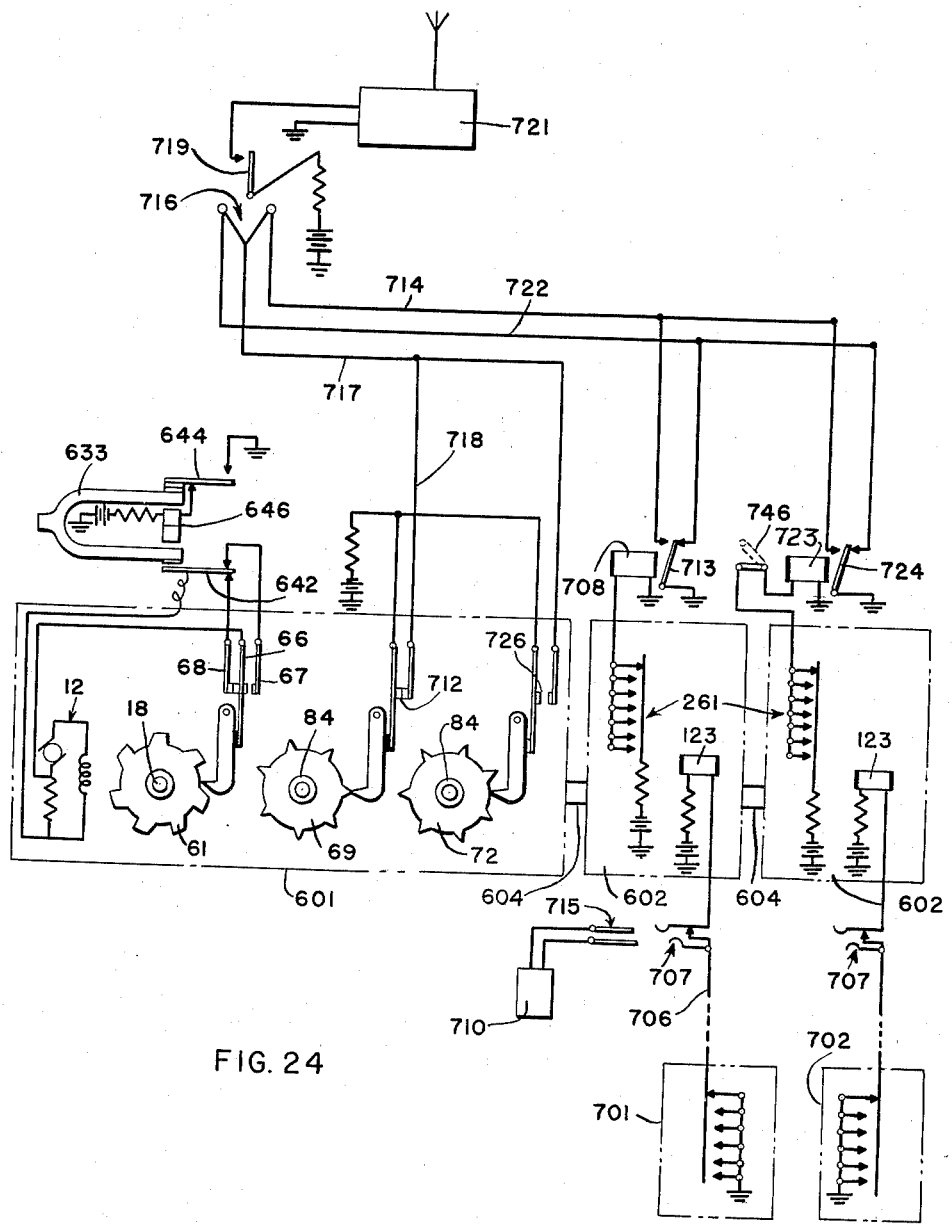
Figure 25:
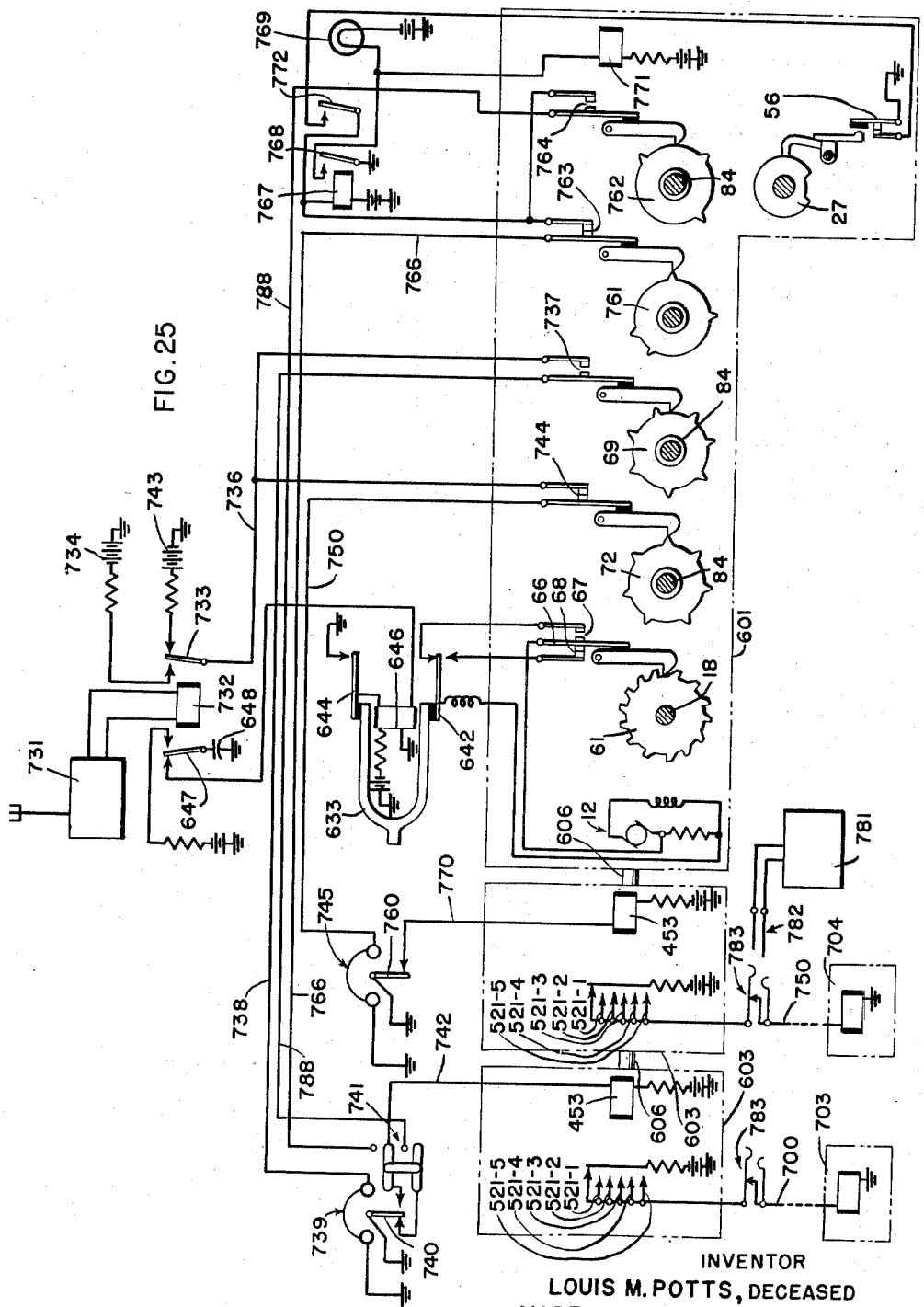
Figure 26:
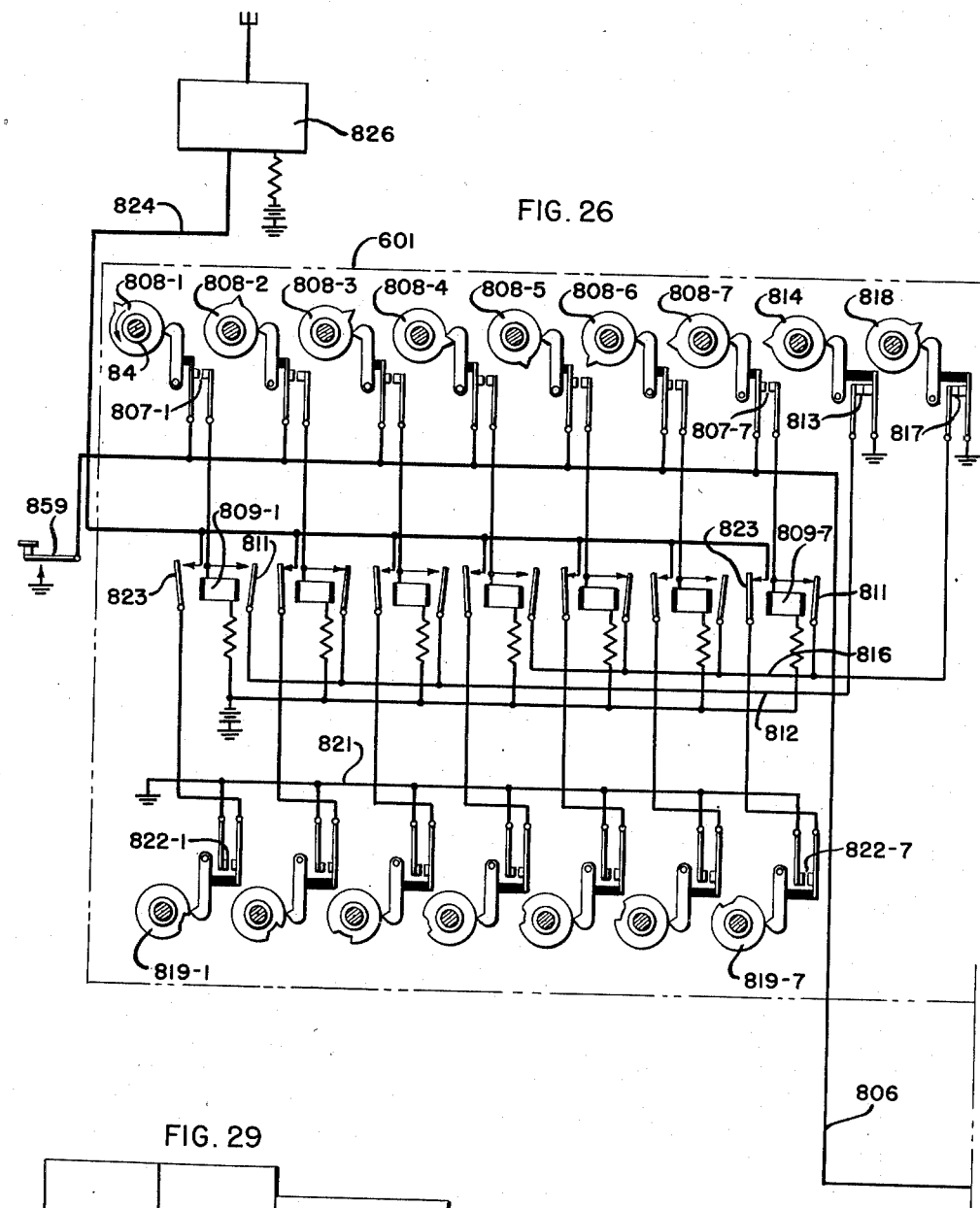
Figure 29:
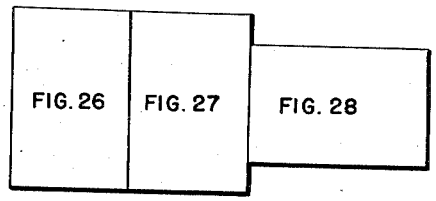
Figure 30:
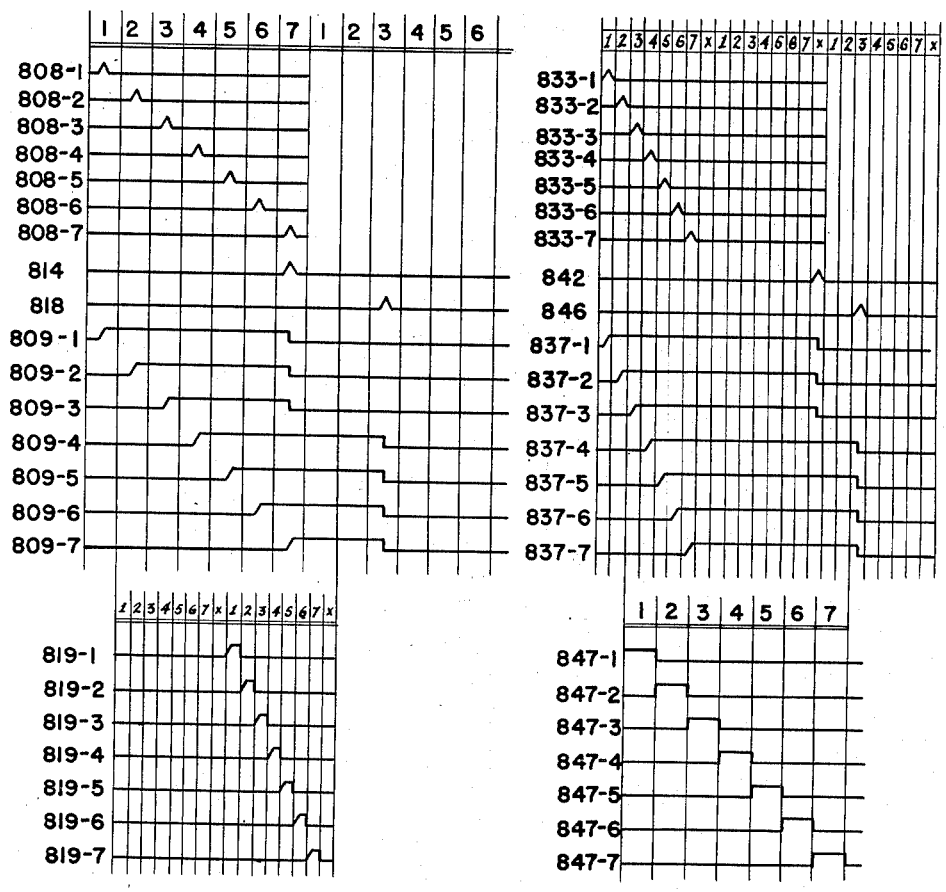

A more comprehensive understanding of the invention may be had by reference to the following detailed description when read in conjunction with the drawings wherein:

Fig. 1 is a plan view of the motor unit;
Fig. 2 is a partial end view of the motor unit;
Fig. 3 is a detailed view of a portion of the motor unit particularly illustrating a cam sleeve orienting device;
Fig. 4 is a detailed view of a portion of the motor unit showing a finder mechanism;
Fig. 5 is a detailed view of a cam operated contact device used in the motor unit for synchronizing purposes;
Fig. 6 is a plan view of the five to seven unit code conversion unit;
Fig. 7 is a detailed view of a portion of a mechanism used for transmitting idle signals in the five to seven unit code conversion unit;
Fig. 8 is an enlarged detailed perspective view, partly exploded, of a mechanism used for delaying certain functional operations while idle signals are being transmitted;
Fig. 9 is a partial end view of the five to seven unit code conversion unit;
Fig. 10 is a detailed view of a part of the idle signal transmitting mechanism;
Fig. 11 is a detailed view, particularly illustrating the single magnet selector utilized in the five to seven unit conversion unit;
Fig. 12 is a detailed view of the character bar bail;
Fig. 13 is a detailed view of the five to seven unit conversion unit, particularly illustrating the mechanism used for storing and transferring seven unit code signals;
Fig. 14 is a detailed view of the latching levers used for the seven unit transmitting levers and the idle signal transmitting levers;
Fig. 15 is a timing diagram of the operation of the five to seven unit code converter unit;
Fig. 16 is a plan view of the seven to five unit code converter unit;
Fig. 17 is a detailed view of the single magnet selector used with the seven to five unit code converter unit;
Fig. 18 is a partial detailed end view of the seven to five unit converter unit;
Fig. 19 is a detailed view of a finder mechanism used with the seven to five unit code converter unit;
Fig. 20 is a detailed view of the character bar operating bail of the same unit;
Fig. 21 is a partial detailed view of the mechanism utilized in the same unit for transmitting reconverted five unit start-stop signals;
Fig. 22 is a detailed view of a clutch operating mechanism used in the seven to five unit code converter unit;
Fig. 23 is a schematic circuit illustration of one system to which the invention is applied;
Fig. 24 is a schematic circuit illustration of a transmitting terminal;
Fig. 25 is a schematic circuit illustration of a receiving terminal of a second system;
Figs. 26, 27, and 28 together constitute a schematic circuit illustration of a two way radio system used in the present invention;
Fig. 29 illustrates how the drawings should be placed in Figs. 26, 27, and 28; and
Fig. 30 is a timing diagram of the two way radio system.

With particular reference to Figs. 1 to 5, inclusive, the motor unit contemplated by the present invention will first be described. Numeral 11 represents the base of the unit, upon which is mounted a motor 12 which imparts rotary movement to shaft 13 and a gear 14 fixedly carried thereby. Gear 14 is in mesh with a gear 16 supported upon a hub 17 which is mounted about shaft 18 for relative movement with respect thereto. By means of an escapement mechanism 19 (to be later described), gear 16 drives the shaft 18 which is suitably journaled on the vertically extending supports 21 and 22. Fast to shaft 18 are the gears 23 which are in mesh with gears 24, for the purpose of driving identical cam assemblies 26 as will later be described.

Carried on the hub 17 which supports gear 16 is a cam 27 which by means of pin and slot connections 28 supports a slidable escapement member 29. A spring 31, attached at 32 to cam 27 and at 33 to escapement member 29, normally urges the escapement member in a downward direction as viewed in Fig. 4. Escapement member 29 is provided with a beveled camming projection 34 and with a driving projection 36 which engages the teeth of a ratchet 37 fixed to shaft 18 by means of a collar 38. Below shaft 18 is positioned a finder magnet 39 which controls armature 41 pivoted by means of lugs 42 on a fixed shaft 43. Armature 41 includes an upwardly extending arm 44 having beveled surfaces 46 and 47. A spring 48 normally urges armature 41 in a clockwise direction as viewed in Fig. 4.

In accomplishing a finding operation a key 49 is depressed while incoming idle signals are being received. If marking impulses are not received for the second, fifth and seventh impulses as will later be described in connection with the system operations, a relay 51 will be energized and a circuit will be completed through attracted contact tongue 52 for relay 53 which will lock up through its contact tongue 54 and contact pair 56. As contact tongue 57 is attracted, finder magnet 39 is energized and armature 41 moves counterclockwise. Cam 27 is provided with a groove 58, and as this groove presents itself to beveled projection 47 of arm 44 of armature 41, the armature is free to pivot counterclockwise, and as it does so, beveled projection 46 carried by arm 44 engages beveled projection 34 of escapement member 29, camming the escapement member to the left as viewed in Fig. 4. As the escapement member snaps back to its original position on its continued rotation, driving projection 36 of the escapement mechanism will engage the next succeeding tooth of ratchet 37 so that a change in the driving relationship between gear 16 and shaft 18 has now taken place. In other words, ratchet 37 has slipped back one tooth with respect to escapement member 29. As the armature 41 pivots counterclockwise as just explained above, its insulated tail 59 opens the contact pair 56 to break the locking circuit for relay 53. As long as the apparatus is out of phase with incoming idle signals, relay 51 will become energized and the ratchet 37 will slip back a tooth with respect to escapement member 29 in each rotation of gear 16. This presumes that the key 49 will be held down until a point will be reached whereat relay 51 will no longer energize and a circuit cannot be completed through contact tongue 52 for the operation of relay 53. This indicates that the idle signals are being properly received and that the apparatus has been brought into phase with remotely located apparatus. The operation of the escapement mechanism 19 will be better understood when the system descriptions are later considered. The circuit shown in Fig. 4 is provided only for the purpose of illustrating the mechanical aspects of the operation of the escapement mechanism.

Fixedly secured to shaft 18 is a cam 61 whose periphery is pursued by a follower 62 which is pivoted at 63. The number of lobes on the cam 61 may vary with the system in which the apparatus is used so that insulated tail 64 carried by the follower 62 may operate contact blade 66 back and forth between contact blades 67 and 68 a fixed number of times in each revolution of shaft 18. The contact blades 66, 67, and 68 are associated with a tuning fork phasing arrangement, the details of which will be described hereinafter in connection with the systems.

Returning now to the cam assemblies 26, a description of an orienting mechanism associated with each of said assemblies will be described. Cams 69 control contact pairs 71 at one side of each cam assembly while cams 72 control contact pairs 73 located at the opposite side of each cam assembly. Contact pairs 71, 73 are described here for the purpose of illustration but it will be understood that different numerals will be assigned to the contact pairs shown in the system descriptions as will later appear. Gear 24 is fixed to a slidable shaft 74 mounted within a cam sleeve 84 and a sleeve 85 which are journaled on ball bearings 75, and 76. A coiled spring 77 urges the shaft 74 to the left as viewed in Fig. 3 by pressing against the interior of gear 24. Leftward movement of shaft 74 is adjustably restricted by means of a lever 78 pivoted at 79. For adjusting the position of shaft 74 a cup shaped dial member 81 is provided which is threaded upon the annular member 82 and the rim 83 of which bears against lever 78. Thus, by turning the dial member 81, the position of shaft 74 will be adjusted and the relationship between the spiral driving gear 23 and the spiral driven gear 24 may be varied. Projecting through the cluster of cams 69, 72, which incidentally are supported on cam sleeve 84, is a dowel pin 86 which also projects through a collar 87 fixed to shaft 74. Thus, dowel pin 86 acts as a driving connection to rotate the cam assembly 26. Annular member 82 is provided with a pointer 88 for use in conjunction with the graduations 89 inscribed on the dial member 81. Although the specific uses of the motor unit will be described later, it is now apparent that by operation of key 49 the apparatus may be brought into phase with distant apparatus. The orienting mechanism may adjust the apparatus so as to centralize the operation of contact pairs 71, 73 with incoming signals.

With particular reference to Figs. 6 to 15, a description will now be given of the conversion unit which converts five unit start-stop signals into seven unit continuous signals. Numeral 101 represents a base plate which supports a front wall 102 and a rear wall 103. Suitably mounted on walls 102, 103 by means of bearings 104, 106 is a shaft 107. A second shaft 108 extends between walls 102, 103 and is mounted on the bearings 109, 111. Transverse to shafts 107, 108 there is supported on bearings 112, 113 a continuously rotating shaft 114 which is suitably coupled to shaft 18 of the previously described motor unit. Carried by shaft 114 is a gear 116 which is in mesh with a gear 117 fast to shaft 107. Also carried by shaft 114 is a gear 118 which is in mesh with gear 119 fast to shaft 108. Thus, by the above described gearing arrangements continuous rotary motion is imparted to shafts 107, 108. For contributing to the clarity of the description, shaft 107 may be identified as the five unit shaft while shaft 108 may be called the seven unit shaft.

At the front end of shaft 107 is carried a receiver cam sleeve 121 operable under the control of a single magnet selector mechanism 122 in a manner well known in the art. Such a single magnet selector is shown in the patent of Zenner No. 1,937,376, dated November 28, 1933. Each time a start impulse is received by selector magnet 123, stop arm 124 carried by sleeve 121 is freed for rotation as clutch members 120 and 125 become effective, and cams 126—1 to 126—5 sequentially set five swords 127 in either a marking or spacing position according to received signals. Cam 128 is an armature assist cam which assists the operation of armature 129 of selector magnet 123, while cam 132 is a locking cam which operates locking lever 133. The function of cams 128, 132 form no novel part of the present invention and reference should be had to the Zenner patent for a more complete description of these operations. As the swords 127 are set their pointed ends press against either surface 134 or 136 of associated transfer levers 137 which are pivoted at 138 and have their ends nested in notches of associated slidable code bars 139—1 to 139—5.

Also mounted on shaft 107 are cam sleeves 141 and 142 which are independently released for a single revolution as will be later described. Discs 143, 144, and 146 are driving clutch members which are carried by the shaft 107. Discs 147 and 148 are carried by cam sleeve 141 while discs 149 and 151 are carried by cam sleeve 142. The clutch members are provided with the usual felt washers 152, 153, 154, and 156. The entire assemblage just described is spring pressed towards the front of the apparatus by a coiled spring 157 nested in a hollow portion 158 of gear 117. This, of course, is for the purpose of providing the necessary gripping pressure for the clutch members.

On selector sleeve 121 is secured a cam 159, the periphery of which is pursued by follower arm 161 of clutch throwout lever 162 which is suitably pivoted in the apparatus. Clutch throwout lever 162 includes a stop arm 163 which is bent over at 164 to engage lug 166 formed as part of disc 167 secured to cam sleeve 141. Near the end of a revolution of cam sleeve 121, follower 161 of clutch throwout lever 162 is lifted outwardly by cam 159, freeing stop arm 163 from the path of lug 166 of disc 167 and enabling sleeve 141 to rotate for a single revolution. After sleeve 141 is released, cam 159 places throwout lever 162 in its first described position to stop sleeve 141 after it has completed a revolution. Thus, the cycle continues as long as sleeve 121 is rotated. It is understood that sleeve 121 also operates in a start-stop manner for each of its rotations.

Sleeve 142 may be released for a single revolution in two different manners as will now be described. Pivotally mounted on fixed shaft 168 is an inverted U-shaped lever 169 having a follower arm 171 which rides upon a cam 172 carried by sleeve 141 and an arm 173 which includes a stop shoulder 174 which is in the path of a bent over lug 176 of stop disc 177 which is suitably fastened to cam sleeve 142. Also pivotally mounted on shaft 168 is an inverted U-shaped lever 178 having a follower arm 179 which rides upon cam 181 and an arm 182 provided with a lug 183. A third lever 184 is also mounted on shaft 168 and includes a depending arm 186 which has formed thereon a stop shoulder 187. It will be noted that lug 183 of lever 178 is bent to a position where it crosses the arm 186 of lever 184. Stop shoulder 174 of lever 169 as shown is in blocking engagement with lug 176 of stop disc 177. As cam 172 operates follower arm 171, stop shoulder 174 moves out of the path of lug 176 and sleeve 142 is permitted to move a very slight distance until lug 176 abuts against stop shoulder 187 of lever 184. Cam 181 now operates against lever 178 which by means of its lug 183 pushes against arm 186 of lever 184 and stop shoulder 187 is moved out of the path of lug 176 and sleeve 142 is free to complete its single revolution until again stopped by shoulder 174 of lever 169. It is thus seen that the successive action of cams 172, 181 may release sleeve 142.

Sleeve 142 may also be released in a second manner which will now be described. Pivotally mounted on shaft 168 is a lever 188 which includes a depending arm 190 having bent over lug portion 189 which also crosses arm 186 of lever 184. Fastened at 191 to lever 188 is a link bar 192 which at its other end is secured at 193 to a lever 194 which is pivoted at 196 and by means of a follower portion 197 rides upon the cam 198 carried upon sleeve 195 mounted on shaft 108. Thus, as the low part of cam 198 engages follower 197 of lever 194, a spring 199 functions to shift link bar 192 in a direction toward shaft 107, lug 189 of lever 188 is moved against arm 186 of lever 184 and stop shoulder 187 is moved out of the path of lug 176 of stop disc 177 carried by sleeve 142. It is, therefore, now apparent that if cam 172 has functioned to operate lever 169 to remove stop shoulder 174 also from the path of lug 176 of stop disc 177, sleeve 142 is free to rotate providing follower portion 197 of lever 194 is riding the low part of cam 198. The purpose of this arrangement will appear as the automatic insertion of idle signals is later described.

Returning now to the slidable code bars 139—1 to 139—5 the description of the mechanism for converting the five unit signals into seven unit signals will now be resumed. Mounted on sleeve 142 are function cams 201, 202, 203, and 204. Pivotally mounted on rod 168 is a large substantially U-shaped bail 206 which includes a follower projection 207 designed to ride upon the cam 202 under impetus of spring 208. As the high part of cam 202 presents itself to projection 207 the lower portion of bail 206 pushes the individual projections 209 of seven code bars 211—1 to 211—7 moving all code bars to the right as viewed in Fig. 13 against the influence of their individual springs 212.

Pivotally mounted at 213 is a lever 214 which is provided with a follower arm 216 engaging cam 203, and an arm 217 to which is pivotally connected at 220 a stripper bail 218. Also pivotally associated with stripper bail 218 at 215 is a lever 219 which is pivoted at 221 for the purpose of maintaining bail 218 parallel when it is operated. Beneath the stripper bail 218 are pivotally mounted on rod 222 a series of character bars 23 which also underlie five unit code bars 139—1 to 139—5 and seven unit code bars 211—1 to 211—7. Now as stripper bail 218 is operated as follower arm 216 of lever 214 is operated by the high part of cam 203 against the tension of spring 224, all the character bars 223 are pushed downwardly against the action of individual springs 225 and immediately thereafter the high part of cam 202 moves all code bars 211—1 to 211—7 to the right as explained above. While the bars 211—1 to 211—7 are still held, follower arm 216 of lever 214 drops to the low part of cam 203 and a character bar 223 selected by an alignment of code bars 139—1 to 139—5 is allowed to drop into either wide notches 226 or narrow notches 227 of code bars 211—1 to 211—7. Now as cam 202 releases bail 206, code bars 211—1 to 211—7 which present a narrow notch 227 to a selected character bar 223 will be held to the right in a marking position. However, those character bars which present a wide notch 226 to the selected character bar 223 will be moved to the left or spacing position by springs 212. Now according to the operation of code bars 211—1 to 211—7, transfer levers 231 which are pivoted at 232 will be set since their depending arms 233 rest in projections 234 carried by the code bars.

Pivotally carried on rod 236 is a transfer bail 237 which is spring urged to the right as viewed in Fig. 13 by spring 238 and carries at its lower end a cross rod 239. On cross rod 239 are mounted selector swords 241—1 to 241—7 and two idle signal swords 242, 243. Transfer bail 237 includes a follower arm 244 which rides upon cam 246 mounted on cam sleeve 195 of shaft 108. Thus, as the high part of cam 246 engages follower arm 244, transfer bail 237 is rocked back and forth and swords 241—1 to 241—7 acquire a selective setting from transfer levers 231 in conventional telegraph fashion. Swords 241—1 to 241—7 will now engage either surface 247 or 248 of latching levers 249—1 to 249—7 which are pivoted at 250. Mounted on rod 260 are a pair of lock bails 252, 253 having respective follower arms 254, 256 for engaging respective cams 257, 258. Locking bails 252, 253 are provided with the usual blades 259 which may engage either side of a projection 261 formed on latching levers 249—1 to 249—7. When the high part of cam 258 engages follower 256, bail 253 frees latching levers 249—1 to 249—3 and an idle signal latching lever 270 for operation. When the high part of cam 257 engages follower arm 254 of bail 252, latching levers 249—4 to 249—7 and an idle signal latching lever 265 are freed for operations. When the latching levers are freed for operation as just described, they assume the position of their associated swords 241—1 to 241—7 and accordingly their shoulders 259 block or unblock associated gooseneck transmitting levers 261—1 to 261—7 which are mounted on rod 262. Thus, transmitting levers 261—1 to 261—7 may either close transmitting contact pairs 263—1 to 263—7 and send a marking signal or allow the contact pairs to remain open and send a spacing signal when operated by their respective cams 264—1 to 264—7. In a like manner, idle signal latching levers 270, 265, respectively, control the operation of idle transmitting levers 266, 267 which are respectively operated by cams 268, 269. Transmitting lever 266 is adapted to send a marking impulse for the second element of the code and transmitting lever 267 is adapted to send marking impulses for the fifth and seventh elements of the code. However, it should be pointed out that idle signal latching levers 270, 265 are differently shaped and are respectively provided with projections 271, 272 which block all transmitting levers 261—1 to 261—7 from operation when the idle signal is transmitted as will be latter described. This is accomplished as projections 271, 272 are moved to a position to block the depending arms 273 of the transmitting levers 261—1 to 261—7.

The mechanisms involved in the automatic transmission of idle signals will now be described, with particular reference to Fig. 10. Mounted on rod 168 is a large U-shaped locking bail 277. Pivotally carried at 278 by bail 277 is a follower lever 279 which rides upon cam 204. Attached to follower 279 by means of pivot screw 282 is a link bar 283 which is slotted at its opposite end as indicated by numeral 284 to receive bolt 286 carried by a follower arm 287 which is pivoted at 288 and rides upon cam 289. When the high part of cam 204 presents itself to follower 279 and the apex of cam 289 presents itself to follower 287, link bar 283 is shifted to the left as shown in Fig. 10. When this occurs, locking blade 290 of bail 277 is freed from projection 291 of an idle signal control lever 292 which is pivoted at 293. However, if follower 279 is on the high part of cam 204 and follower 287 is on the low part of cam 289, follower 287 does not exert the additional motion which is necessary to shift link 283 far enough to the left to free the idle signal lever 292. By the same token, when follower 279 is on the low part of cam 204 and the follower 287 rides the apex of cam 289, again insufficient motion is imparted to link bar 283 to free the idle signal lever 292. In other words, the sum of the motions produced by the high part of cam 204 and the apex of cam 289 is necessary to shift link bar 283 sufficiently to free idle signal lever 292.

Also pivoted at 293 is a divide pawl 294 which rides upon the cam 201. It is so termed because operation of divide pawl 294 determines whether an idle or a message signal will be transmitted. In the position shown in the drawings, idle lever 292 is locked in its message or line position by blade 290 of bail 277. Also, divide pawl 294 is shown latched up on shoulder 296 of a latching lever 297 which is pivoted at 298 and urged in a clockwise direction by spring 299. A spring 301 interconnects divide pawl 294 and idle signal lever 292 while a lighter spring 302 tends to urge idle signal lever 292 counterclockwise. Now in each revolution of cam 201, the apex of this cam operates divide pawl 294 to latch it up on latching lever 297. Also in each revolution of continuously rotating cam sleeve 195 the cam 246 operates transfer bail 237, and near the end of its stroke, after a selection has been transferred, a portion of the bail 280 strikes latch 297 and thereby releases divide pawl 294.

With reference now to the timing diagram (Fig. 15) a résumé of the various operations will be given and the automatic insertion of idle signals will be explained. Five unit start-stop signals are received by selector magnet 123, as sleeve 121 is rotated. Approximately during receipt of the fifth impulse by selector magnet 123, cam 159 functions to release sleeve 141. Now, assume message signals are being transmitted, cam 198 mounted on sleeve 195 carried by seven unit shaft 108 will function to release sleeve 142 in conjunction with cam 172 of sleeve 141 in a manner explained in an earlier portion of the specification. It should be remembered that sleeve 195 is a continuously rotating sleeve, while sleeve 142 is a start-stop sleeve. Therefore, sleeve 195 is continuously gaining on sleeve 142.

Now as sleeve 142 is released, cam 203 operates stripper bail 218 and all character bars 223 are moved downwardly. Cam 202 now functions to move all code bars 211—1 to 211—7 to the right as described. A selected character bar 223 is operated, as the low part of cam 203 is presented to lever 214 and swords 241—1 to 241—7 are set in their selected positions. Cams 289 and 204 combine to unlock idle signal lever 292 by operation of bail 277. Directly after cam 289 operates, cam 246 operates to transfer a new setting to swords 241—1 to 241—7 by operating bail 237. Cams 257, 258 function successively to enable latching levers to acquire the new setting as bails 252, 253 are operated. This new setting is transmitted immediately thereafter as shown in the timing chart. Prior to the operation of bail 237, divide pawl 294 is latched up on latch 297 by operation of cam 291 and is again tripped by bail 237 near the end of its stroke so that it rides again on the low part of cam 291. Now as long as cam 246 of the seven unit sleeve 195 is operating later than cam 291 of start-stop sleeve 142, idle signal lever 292 will be retained in its live or message signal position during a transfer since with divide pawl 294 latched up on latch 297, spring 301 is distended and tends to pivot idle signal lever 292 clockwise. It is assumed in the present description that sleeve 195 and sleeve 142 are moving towards the left in the timing diagram and that the apex of cam 289 is at this time in line with the high part of cam 204. After a series of cycles the apex of cam 289 will be operating in step with the low part of cam 204 and obviously bail 277 cannot unlock idle signal lever 292 at this time. Now as cam 289 continues to gain on cam 204, a point will be reached where the apex of cam 289 will again function in step with the high part of cam 204. This is an indication it is now time to insert an idle signal which must be inserted without losing a signal stored on transfer levers 231. In other words, transfer of the stored signal must be delayed as will hereafter appear while an idle signal is transmitted and such an operation must be accomplished without loss of any message signals.

When seven unit sleeve 195 has gained on sleeve 142 to the point where the apex of cam 289 again operates in conjunction with the high part of cam 204 to unlock idle signal lever 292, idle signal lever will now be moved to its idle position by spring 301. Now as the transfer is made by bail 237, idle signal swords 242, 243 will be set in their idle positions. Bail 237 will again attempt to trip latch 297 at the end of its stroke but it will be ineffective since latch 297 will still be tripped from the previous cycle. These just described operations were made possible since divide pawl 294 is now operated at this point after the transfer has been made by bail 237 and after latch 297 was ineffectually operated.

While message signals were being transmitted, cams 198 and 172 were effective to release sleeve 141 as explained. However, the release of sleeve 142 is now delayed as the idle signal is transmitted. The combined action of cams 172 and 181 of sleeve 141 will now be necessary to release sleeve 142. When idle signal sword 242 moves to its idle position, projections 311 of idle signal latching levers 270, 265 move into the path of projection 312 of lever 194 so that cam follower projection 197 of lever 194 cannot move to the low part of cam 198 and, therefore, link bar 192 cannot function to release cam sleeve 142 in conjunction with cam 172. In other words, sleeve 142 cannot be released until cam 181 operates after cam 172. During this time sleeve 195 makes a further gain on sleeve 142 due to the delay in releasing sleeve 142. At this time the idle signal is being transmitted by idle transmitting levers 266, 267, while transmitting levers 261—1 to 261—7 are blocked by projections 271, 272 of latching levers 270, 265. Now, while the idle signal is being transmitted, cam 291 will function to reset divide pawl 294. The apex of cam 289 will again be in step with a high part of cam 204 so that before cam 246 operates to make the signal transfer, divide pawl 294 by means of spring 299 will move idle signal lever 292 to its live or message position. As the idle signal transfer is made by operation of cam 246 and bail 237, the signal which was delayed will not now be transferred. It will be noted that this is accomplished approximately in the latter half of the transmission of the sixth element of the idle signal. It will be further noted that cams 258, 257 function immediately afterward to operate bails 252, 253 and permit transmitting levers 261—1 to 261—7 to acquire the delayed message code combination and now transmit the delayed signal. During this interval when the above transfer was made, the idle signal swords 242, 243 were moved to their idle position and levers 270, 265 were accordingly operated so that projections 311 of levers 270, 265 no longer block lever 194 from operation. However, now the high part of cam 198 holds the follower projection 197 of lever 194 so that the sleeve 142 cannot be released by the combined action of cams 172 and 198. However, immediately thereafter the low part of cam 198 will present itself to the follower projection 197 of lever 194 and the sleeve 142 will now again be released in successive cycles by the operation of cams 172 and 198 until it is time to insert another idle signal. It may be further observed that while the release of sleeve 142 was delayed, the operation of cams 203, 202 carried thereby was also delayed so that the setting of the code bars 211—1 to 211—7 and transfer levers 231 in accordance with the next following message signal was also temporarily deferred. Such a transfer now occurs immediately after the preceding delayed signal is transferred to swords 241—1 to 241—7 by operation of cam 246 and bail 237. Thus, there is no loss of signals when the idle signal is inserted. It will be noted that when cam sleeve 142 is at a complete rest and start-stop signals are being converted, a high part of cam 204 presents itself to follower 279 of bail 277 so that the idle signal lever 292 may be released to its idle position for the transmission of a series of idle signals. Divide pawl 294, of course, will not be operated with cam sleeve 142 idle and it will remain continuously in its tripped position under these conditions.

Having reference now to Figs. 16 to 22, a description will be given of the converter unit which converts seven unit continuous signals into five unit start-stop signals. Numeral 401 represents the base of the unit upon which is suitably mounted end walls 402, 403. On bearings 404, 406 secured to end walls 402, 403, respectively, is mounted shaft 407, while on bearings 408, 409 secured to end walls 402, 403, respectively, is mounted shaft 411. Suitably mounted on bearings 412, 413 is a shaft 414 which is coupled in any conventional manner to the motor unit hereinbefore described.

Fast to shaft 414 is a gear 416, which is in mesh with a gear 417 carried about the shaft 411. The relationship of shaft 414 to gear 417 is adjustable by means of a finder arrangement to be later described while the position of a seven unit receiving cam sleeve 418 may be adjusted by means of an orienting mechanism now to be described. Gear 417 has pivoted thereon at 420 a pawl 419 which is normally spring pressed into engagement with a ratchet 421 secured to shaft 411. Projecting from ratchet 421 is a pin 422 which engages in a spiral slot 423 carried by a cut like member 424 which is suitably secured to cam sleeve 418. Shaft 411 is slidable in bearings 408, 409 and is normally urged to the left by a lever 426 which is pivoted at 427 and urged counterclockwise by spring 428. At its front end, shaft 411 is engaged by a lever 429 against which bears a cam surface 431 of a pivoted indicator 432 mounted on orienting plate 433. Plate 433 is similar to plate 105 shown in Fig. 4 of Patent No. 1,904,164 of Morton et al., dated April 18, 1933. Plate 433 is provided with the usual graduations (not shown) and thus an operation by grasping the handle 434 of pivoted indicator 432 may vary the position of shaft 411. This causes pin 422 to move in the spiral slot 423 of member 424 to rotate member 424 and causes the sleeve 418 therefore to be adjusted with respect to shaft 411 or more properly with respect to the incoming signals.

Operation of a finder mechanism associated with this conversion unit will now be described. The finder mechanism operates in a somewhat similar manner to the finder mechanism described in connection with the motor unit. It will be understood that both the finder mechanisms may not have to be used. The finder mechanism about to be described may find utility if a separate motor were used to drive the seven to five unit code conversion unit, rather than the motor unit previously described. As described above, pawl 419 carried on gear 417 is in engagement with ratchet 421 and thereby drives ratchet 421. Operable by a finder magnet 436 is an armature 437 having a follower arm 438 and a pawl tripping arm 441, the armature being pivoted on rod 442. When finder magnet 436 is energized due to failure of the apparatus to be in phase with apparatus at a remote station in response to the receipt of idle signals, the armature 437 is attracted and when groove 443 of a cam 444 carried on sleeve 445 presents itself to follower arm 438, the follower arm 438 will drop into the groove and the free end of pawl tripping arm 441 will move into the path of pawl 419 and cause the pawl to be tripped and engage the next succeeding tooth of the ratchet so that the driving relationship between gear 416 and cam sleeve 418 has been altered. This operation is cyclically repeated until the correct phase is established. There are seven teeth on the ratchet 421 which represents the seven code elements of a signaling code combination. Thus, the finder mechanism may be used for phasing the apparatus with respect to incoming signals while the orienting device can be used for adjusting cam sleeve 418 within the individual impulses. Contact pair 448 is operated in a manner similar to contact pair 56 which was described in connection with the finder mechanism included with the motor unit.

Also carried on shaft 414 is a gear 451 which is in mesh with a gear 452 carried on shaft 407. For the purpose of the present description shaft 411 may be referred to as the seven unit shaft and shaft 407 may be considered to be the five unit shaft. Incoming continuous seven unit signals are received by the selector magnet 453 which is part of a single magnet selector 454. As the signals are received the seven swords 456 are set in the usual manner according to the nature of the received impulses by the sequential operation of cams 457—1 to 457—7 carried by receiving cam sleeve 458. In addition, cam sleeve 458 carries lock cams 459, 461 which respectively operate lock bails 462, 463 during receipt of the seventh and first impulses of a code combination. Bails 462, 463 are both pivoted on the rod 464 and are provided with the usual springs 465 for enabling the bails to follow the periphery of their cams by means of their respective follower arms 466, 467. Each bail is provided with a locking blade 468 designed to engage either side of projections 469 carried by locking levers 471—1 to 471—7. Bail 462 controls locking levers 471—1 to 471—3 and bail 463 controls locking levers 471—4 to 471—7. The pointed end of swords 456 may engage either surface 472 or 473 of associated lock levers 471—1 to 471—7 and accordingly operate the lock levers about the pivot 474 when the locking bails 462, 463 are operated. The lower ends of levers 471—1 to 471—7 are engaged in notches 476 of associated notched seven unit code bars 477—1 to 477—7. Underlying the seven unit code bars 477—1 to 477—7 and the five unit code bars 478—1 to 478—5 are a series of character bars 479 which are pivoted on rod 427 and urged upwardly by individual springs 481.

Carried on sleeve 418 is a cam 482 which in each cycle of operations rocks the follower 483 about its pivot 484. Follower 483 is urged clockwise by means of a spring 487 and is pivotally connected at 488 with stripper bail 489. For maintaining parallelism, bail 489 is pivotally connected at 491 with a lever 492 which is pivoted at 490. As the high part of cam 482 works against follower 483, all character bars 479 are moved downwardly and while they are so held a cam 493 operates a follower 494 about its pivot 495 against the tension of spring 496 to push all code bars 478—1 to 478—5 to the left by reason of the engagement of follower 494 with projection 497 of the code bars. Follower 483 now drops off the high part of cam 482 while code bars 478—1 are held to the left and a selected character bar 479 now moves into an alignment of notches in code bars 477—1 to 477—7 and into an alignment of wide notches 498 and narrow notches 499 of code bars 478—1 to 478—5. Now when follower 494 drops to the low part of cam 493, code bars 478—1 to 478—5 having wide notches 498 in engagement with the selected character bar 479 will be allowed to be drawn to the right or spacing position by individual springs 501, while those having narrow notches 499 will be retained to the left in marking positions. Pivotally supported at 502 on individual code bars 478—1 to 478—7 are latches 503, which are spring urged to the left by individual springs 504. Formed on latches 503 are bifurcations 506 which straddle the lower end of a latching lever 507 which is pivoted at 508. At its upper end, each latching lever 507 is provided with a projection 509 designed to be engaged at either side by blade 511 of locking bail 512 which is pivoted on rod 513 and urged counterclockwise by spring 514. Bail 512 includes a follower arm 516 which rides upon cam 517 carried by transmitting sleeve 518 of shaft 407. When bail 512 is operated, latching levers associated with code bars 478—1 to 478—5 set in spacing position will be in the position shown and shoulders 519 of lever 507 will prevent closure of transmitting contact pair 521 by transmitting gooseneck lever 522 when cam sleeve 517 and cams 520—1 to 520—5 are released. On the other hand, upon operation of bail 512, those code bars 478—1 which are in marking position to the left by means of springs 504 will now cause levers 503 to pivot slightly counterclockwise thereby withdrawing shoulder 519 from the path of transmitting gooseneck levers 522 and enable closure of transmitting contact pairs 521—1 to 521—5 when cam sleeve 518 is released for operation. It should be pointed out that as a code bar 478—1, for example, is moved to the left, spring 504 is placed under tension and tends to draw lever 503 counterclockwise but cannot do so until bail 512 is operated. This makes possible a signal overlap arrangement to hold a signal code combination by means of code bars 478—1 to 478—5 until bail 512 is operated.

The means of releasing the transmitting sleeve 518 by operation of clutch 515 will now be described. Carried by sleeve 518 is a release disc 524 which in the rest position of the sleeve, has a high part in engagement with stop arm 525 of a clutch lever 526 which is pivoted at points 527 and urged in a clockwise direction by spring 528. Pivoted at 529 is a follower 531 which is urged clockwise by a spring 532 and rides upon a cam 533 carried by sleeve 418 of shaft 411. In the position shown, follower 531 holds a slidable bar 534 to the left. However, when follower 531 is operated by cam 533, a spring 536 pulls bar 534 to the right and a projection 537 formed thereon engages tail 538 of clutch lever 526 to thereby release cam sleeve 518. When an idle signal is received, idle character bar 539 will move into notch 541 of bar 534 to thus prevent the release of cam sleeve 518.

A typical conversion operation by means of the seven to five unit converter will now be briefly described. A seven unit signal code combination is received by selector magnet 453. During receipt of the sixth element of the code, bail 466 operates and code bars 477—1 to 477—3 are set. During the next following first element period of the code, bail 467 operates and code bars 477—4 to 477—7 are set. Immediately thereafter, cams 482 and follower 483 function together with cam 493 and follower 494 as explained to enable code bars 478-1 to 478—5 to receive the converted selection. Approximately during the fifth element period of the seven unit code, cam 533 functions to release cam sleeve 518. Immediately thereafter bail 512 operates and frees latching levers 507. The five unit start-stop signal is transmitted as cam sleeve 518 is released. It should be mentioned that the usual start-stop transmitting cam 540 is provided on sleeve 518. If an incorrect signal is received by the seven unit selector which is not composed of three marking and four spacing impulses, the five unit start-stop sleeve 518 will be released and an all spacing signal will be transmitted as no character bar is selected at this time since all code bars 478-1 to 478-5 will move to their spacing positions. Receipt of an all spacing signal by the five unit receiving station will cause the printing of an error indication character.

Now that the operation of the apparatus units has been described, a description of the radio simplex conversion system shown in Fig. 23 will be given. Numeral 601 indicates a motor unit, numeral 602 represents a five to seven unit code converter unit, and numeral 603 stands for a seven to five unit code converter unit, al lof which have been previously described in detail. Units 602, 603 are driven by the motor unit 601 by means of suitable mechanical couplings schematically represented by numerals 604, 606. Only one station is shown in the drawing but it will be understood that the station shown is adapted to transmit signals to and receive signals from an identically equipped remote station.

An outlying extensor station 607 transmits five unit start-stop signals by means of transmitting contacts 605 through selector magnet 610, over line 608 through start-stop contact 521-S located in converter unit 603, over lead 609, through selector magnet 123 of converter unit 602. Signals received by selector magnet 123 are converted into seven unit signals, which are generated by transmitting contacts 261—1 to 261—7, over lead 611 to radio transmitter 612. It will be assumed that the local station shown is now transmitting to a remote station. For transmitting to the remote station, a switch 613 is moved to the left to its transmitting position. The remote station will have its switch 613 moved to the right or receiving position. When switch 613 is operated to the left, transmitting antennae 614 is rendered operative, while in its rightward position receiving antennae 616 is rendered operative. Signals received by the distant antennae 616 operate a radio receiver 617 which in turn controls the operation of a receiving relay 618. As contact tongue 619 moves back and forth, signals are provided over lead 621 for the receiver selector magnet 453 of converter unit 603. The seven unit signals are now converted into five unit start-stop signals which are generated over lead 608 at the distant station to operate the selector magnet 610 at an outlying extensor station 607. If it is desirable from an operating standpoint, the cam sleeve which controls transmitter contacts 261—1 to 261—7 may be shut down when signals are being received, since the signals received through selector magnet 123 may reconvert the signals to seven unit signals. However, such a reconversion is ineffectual since switch 613 would be in its receiving position and the transmitting antennae 614 would be disconnected.

For synchronizing motor 12 with a similar motor at a distant station, a motor synchronizing arrangement will now be described. A tuning fork 641 has a natural frequency of vibration which is equivalent to a full vibration for each signal impulse received from a station which is transmitting. Mounted on one of the tines of the tuning fork 641 is a vibrating contact tongue 642. Controlled by cam 61 are the contact blades (see Fig. 5) 66, 67, 68, the operation of which has been previously described. Blade 66 operates in conjunction with contact 642 to periodically close a shunting circuit for a resistance 643 which is in series with the armature of motor 12. As the phase relationship of blade 66 varies with respect to vibrating contact tongue 642 according to changes in speed of the motor 12, the operation of resistance 643 will be varied to accordingly correct the speed of the motor. Once the tuning fork is set into vibration, such vibration is maintained by vibrating contact 644 attached to a tine of tuning fork 641 which closes an obvious circuit to the lower winding of double wound magnet 646. Correcting impulses for double wound magnet 646 are provided by the reversal of signal impulses received by receiving relay 618 as will now be described. As contact tongue 647 of receiving relay 618 is operated in accordance with received signals, condenser 648 is periodically charged and discharged over lead 649 through the upper winding of double wound relay 646. The impulses thus provided for the upper winding of relay 646 insures that the tuning fork 641 will be retained at signal frequency vibration if there is any tendency to deviate therefrom.

A finder arrangement for the motor unit 601 which operates in response to the receipt of idle signals (second, fifth and seventh impulses marking) will now be described. It will be understood that phasing will be accomplished only at a station which is receiving idle signals. Reference should be had to the mechanical description for a complete understanding of this portion of the invention. The circuit has been slightly modified over what is shown in the mechanical drawings, the previous circuit being only for the purpose of illustrating the mechanical aspects of the invention. On one of the cam assemblies 26 in the motor unit 601 is included the sleeve 84 with only two of the many cams 69, 72 utilized for the particular system now being described. Cam 69 has four lobes which operate during the first, third, fourth, and sixth impulse period if the apparatus is properly phased while cam 72 has three lobes which operate during receipt of the second, fifth, and seventh impulses when the apparatus is properly phased. Cam 69 controls contact 622, and cam 72 controls contact 623. When a phasing operation is to be accomplished key 49 is held depressed. Now if a marking impulse is received when the lobes of cam 69 are operating contact 622, it is an indication that the apparatus is out of phase, since spacing impulses should be received during the first, third, fourth and sixth impulse periods. If a marking impulse is received during such periods, a circuit is completed through contact tongue 619 of receiving relay 618, over lead 624, through contact 626 (now closed), over lead 627, through contact 622 (now closed) and through the winding of relay 628. As relay 628 operates, it pulls up contact tongues 629, 631, and 632. Closure of contact tongue 629 provides an obvious circuit for signal lamp 633. Illumination of lamp 633 therefore gives a visual indication that the apparatus is out of phase. Closure of contact tongue 632 provides a locking circuit for relay 628 which extends over lead 634 and through grounded contact 56. Closure of contact tongue 631 provides an obvious circuit extending over lead 636 for finder magnet 39. The lobes of cam 72 may similarly cause operation of relay 628, if during the operation of these lobes spacing impulses are received by relays 418, over the following circuit: From contact tongue 619 of relay 618, over lead 637, through contact 638 (now closed) over lead 639 and through closed contact 623 to the winding of relay 628. As was previously pointed out in the mechanical description, as long as the received signals are out of phase with the apparatus, finder magnet 39 will remain energized and the escapement mechanism 19 (Fig. 4) will operate in each cycle until the apparatus is properly phased with the incoming signals. It should be obvious from the above description that relay 628 cannot be operated while the signals are properly received.

A second system embodying the use of the apparatus units previously described is shown in Figs. 24 and 25, and its operation will now be explained. The system now under consideration is a one way, two channel radio conversion system wherein the groups of signal impulses for one channel are interleaved with respect to the groups of signal impulses of another channel. Fig. 24 represents a transmitting terminal with which is associated two outlying or extensor transmitting stations 701, 702 which, respectively, are designed to transmit signals to outlying or extensor receiving stations 703, 704 associated with a receiving terminal shown in Fig. 25.

At the transmitting terminal is located a motor unit 601, and two five to seven unit converter units 602. Five unit start-stop signals originating at transmitting station 701 pass over line 706 and through jack 707 to selector magnet 123. The five unit signals are converted to seven unit signals as previously described which are repeated by contacts 261—1 to 261—7 to relay 708. It will be understood that the cam sleeve controlling the transmitting contacts 261—1 to 261—7 of one unit will be adjusted with respect to the cam sleeve controlling the transmitting contacts 261—1 to 261—7 of the other unit to provide the proper transmitting phase for transmitting interleaved signals. Motor unit 601 is now provided with cams 69, 72 mounted on sleeve 84 as described in connection with cam assemblies 26 of the motor unit. Each cam 69, 72 has seven lobes offset midway with respect to each other in order to interleave the signals as will now be explained. Cam 69 functions to enable the transmission of signals which originate from station 701, and cam 72 functions to enable the transmission of signals which originate from station 702.

When a marking impulse is received by relay 708, a lobe of cam 69 should be closing contact pair 712 and a circuit is now traceable as follows: From ground, through contact tongue 713, over lead 714, through the right-hand winding of polar relay 716, over leads 717, 718 and through contact pair 712 to battery. When this occurs, contact tongue 719 of polar relay 716 will close and a marking signal will be transmitted by radio transmitter 721. When a spacing signal is received by relay 708, a similar circuit is completed over lead 722 for the left-hand winding of polar relay 716 when relay 708 receives a spacing impulse and contact tongue 719 moves to its open or spacing position. A spacing signal is, of course, transmitted at this time by radio transmitter 721. On converted signals originating from station 702, relay 723, contact tongue 724 and contact pair 726 of cam 72, similarly function to control the polar relay 716. The speed of motor 12 is regulated by tuning fork 633 in a manner such as was described in connection with the previous system. However, in this case, only the upper winding of relay 646 is connected since correcting signals are needed only at the receiving terminal. A monitor printer 710 may be connected in line with either station 701 or 702, if desirable, by inserting plug 715 in the appropriate jack 707.

Signals are received at the receiving terminal by radio receiver 731 and receiving relay 732 is accordingly operated. At the receiving terminal are provided two seven to five unit converter units 603 which are designed to transmit signals to outlying receiving stations 703, 704. There is also provided at the receiving terminal a motor unit 601 which drives both converter units 603. Cams 69, 72 are now employed for picking off the signal impulses of the individual channels in order to separate the interleaved signals as will presently appear.

Transmission of signals to outlying receiving station 703 will now be described. When a marking signal is received by receiving relay 732, contact tongue 733 is attracted and a circuit is established as follows: From battery 734, through closed contact tongue 733, over lead 736, through contact pair 737, now closed by a a lobe of cam 69, over lead 738 and through the winding of polar relay 739. Contact tongue 740 now moves to the right, completing a circuit for selector magnet 453 as follows: From ground, through contact tongue 740, through the middle tap of a switch 741, over lead 742 and through the winding of selector magnet 453. Thus, selector magnet 453 will receive the seven unit signals which are converted into five unit start-stop signals, and repeated by contacts 521—1 to 521—5, as previously described, to the outlying station 703 over line 700. When a spacing impulse is received by relay 732, contact tongue 733 moves against its back contact and completes a similar circuit for relay 739. However, the battery 743 is oppositely poled with respect to battery 734 and polar relay 739 operates its tongue 740 to open the circuit to selector magnet 453. Cams 72 whose lobes are set midway between the lobes of cam 69, operate contact pair 744 to cause signals to be transmitted from station 701 to the outlying receiving station 704 by operation of polar relay 745 over lead 750. Operation of contact tongue 760 repeats signals over lead 770 to selector magnet 453 for operation of station 704. It will be understood, that the receiving cam sleeve 418 (Fig. 18) of one converter unit will be adjusted with respect to the same cam sleeve of the other converter unit so that the incoming signals will be properly phased. For this purpose the orienting mechanism shown in Fig. 18 may be used.

For phasing the motor 12 at the receiving terminal with the motor 12 at the transmitting station, a phasing arrangement identical with the phasing arrangement described in connection with the first system is employed. The parts are identically numbered with respect to like parts appearing in Fig. 23 and its is felt that the description need not be repeated. It will be noted, however, that double wound magnet 646, operable by tuning fork 641, has its lower winding connected so as to receive phase correcting impulses from contact tongue 647 of relay 732 as condener 640 discharges. Another point of difference is that the frequency is now doubled to fourteen full vibrations per cycle since two sets of signals are now received in each cycle and cam 61 is, therefore, now provided with fourteen lobes.

A phase finder arrangement adapted for use with the motor unit 601 will now be described. When a phasing operation is to take place, switch 746 at the transmitting terminal is moved to its open position, thereby allowing only station 701 to transmit the idle signals for a phasing operation. At the receiving station, switch 741 is operated to its upward position cutting out the selector magnet 453 of the converter unit which sends signals to receiving station 703. Motor unit 12 at the receiving terminal is provided with additional cams 761, 762 mounted on sleeve 84. Cam 761 when properly phased closes contact pair 763 during the first, third, fourth, and sixth impulse periods of a seven unit code. Similarly, cam 762 closes contact pair 764 during the second, fifth, and seventh impulse periods. If it is assumed that a marking impulse is received during the first, third, fourth, or sixth impulse periods, a circuit will extend from ground, through contact tongue 740, through the upper tap of switch 741, over lead 766, through contact pair 763, through the winding of relay 767. As relay 767 operates, it attracts contact tongue 768. Signal lamp 769 is now lit over an obvious circuit indicating that the apparatus is improperly phased and finder magnet 771 is operated since a spacing impulse should be received during these intervals. Relay 767 will have locked up at this time through operation of contact tongue 772 and contact 56 of cam 27. Detailed operation of the finder mechanism was previously explained in connection with the motor unit. A circuit may similarly be completed over lead 789 and through contact pair 764 for relay 767 if a spacing impulse is received during the second, fifth, and seventh impulse periods. When the apparatus is properly phased, finder magnet 771 will no longer be operated and lamp 769 will be extinguished. Converter 602 which receives signals from station 701 will thus be synchronized with converter unit 603 which transmits signals to station 704. The phase relationship of converter unit 603 which sends signals to station 704 may be adjusted by operation of the orienting mechanism shown in Fig. 18 so that both converter units 603 properly receive the interleaved signals. A monitor printer 781 may also be used at the receiving terminal for checking purposes by inserting plug 782 into either of the jacks 783.

A third system about to be described is shown in Figs. 26 to 30 and relates to a duplex radio system, utilizing a single frequency transmission band. The system is based on a time division transmission system (Fig. 30) in which a cycle is composed of sixteen intervals. During the first seven intervals transmission may take place in one direction and during the ninth to the fifteenth intervals transmission may take place in the opposite direction. The eighth and sixteenth interval periods are idle, so that the signal impulses being transmitted in opposite directions may vary slightly in phase without interference. The signals are actually generated from opposite stations at the same time. However, prior to transmission the signals are compressed into approximately one half of a cycle and then expanded to a full cycle after being received.

Only one terminal of the system is shown in the drawings but it will be understood that another terminal similarly equipped is contemplated by the invention. Numeral 601 represents a motor unit which drives the two converter units 602, 603. An outlying transmitting station is shown at 801 while an outlying receiving station is shown at 802. Five unit start-stop signals are originated at station 801 and proceed over line 803, through jack 804 and through the winding of selector magnet 123. The signals are converted into seven unit signals as explained, and are generated by transmitting contacts 261—1 to 261—7 over lead 806, through transmitting contacts 807—1 to 807—7, sequentially operable by cams 808—1 to 808—7, and through the winding of individual storage relays 809—1 to 809—7 to battery. When storage relays 809—1 to 809—3 become energized, they lock up through locking tongues 811, over lead 812, through contacts 813 controlled by cam 814. Similarly, when storage relays 809—4 to 809—7 become energized, they lock up through locking tongues 811, over lead 816 and through contacts 817 controlled by cam 818. Cams 808—1 to 808—7 and transmitting cams 819—1 to 819—7 may be mounted on sleeve 84 in one of the cam assemblies 26 described previously in connection with the motor unit. When storage relays 809—1 to 809—7 are energized, circuits may be traced from grounded lead 821, through transmitting contacts 822—1 to 822—7 sequentially operable by cams 819—1 to 819—7, through tongues 823 (when closed) and over lead 824 to radio transmitter 826.

It is to be understood, that sleeve 84 of the motor unit will be properly phased with respect to the sleeve which controls transmitting contacts 261—1 to 261—7. Thus, contacts 261—1 to 261—7 will be operated in synchronism with individually associated contacts 807—1 to 807—7 and storage relays 809—1 to 809—7 will be accordingly operated during a full cycle of operations. However, it will be observed that cams 819—1 to 819—7 are cut so as to transmit a selection provided by relays 809—1 to 809—7, in approximately one half revolution of sleeve 84. This is clearly indicated by the timing chart shown in Fig. 30. Approximately during the seventh full cycle impulse period, cam 814 opens contacts 813, to thereby erase a selection stored by storage relays 809—1 to 809—3, and frees these relays for receipt of the next selection. Approximately during the third full cycle impulse period, cam 818 opens contacts 817 to thereby erase a selection stored by storage relays 809—4 to 809—7 and frees these relays for receipt of the next selection. It will be noted by reference to the timing chart, that the first element of the compressed signal is transmitted approximately during the fifth impulse period and that the last element of the compressed signal is transmitted approximately during the following first impulse period. It will be further observed by reference to the timing chart that since the signal code combinations are compressed into approximately one half of a cycle, that the other half of the cycle may be used to receive signals on the same frequency band from the opposite station. It is to be understood that a similar set of cams 819—1 to 819—7 at the remote station will function with a 180° displacement from the cams described at the local station.

Incoming signals are received from the opposite terminal by the radio receiver 831 and accordingly receiving relay 832 is operated. A set of receiving cams 833—1 to 833—7 which may be mounted on sleeve 84A of a second cam assembly 26 (see motor unit) operates in phase with cams 808—1 to 808—7 at the distant station, such operation being approximately in seven sixteenths of a cycle. Thus, as the signals are received, cams 833—1 to 833—7 sequentially close contacts 834—1 to 834—7 and contact tongue 836 of receiving relay 832 repeats the incoming signals to individual storage relays 837—1 to 837—7. As storage relays 837—1 to 837—3 operate, they are locked up through contact tongues 838, over lead 839, and through contacts 841 controlled by cam 842. Similarly, as storage relays 837—4 to 837—7 operate, they are locked up through contact tongues 838, over lead 843 and through contacts 844 controlled by cam 846. By referring to the timing chart, it is observable that approximately during the sixth impulse period of the full seven unit cycle, cam 842 opens contacts 841 and erases a selection stored by storage relay 837—1 to 837—3 and frees these relays for receipt of the next selection while approximately during the end of the seventh impulse period cam 846 opens contacts 844 to erase a selection stored by storage relays 837—4 to 837—7, and frees these relays to receive the next selection.

Mounted also on cam sleeve 84A are cams 847—1 to 847—7 which are notched so that each cam operates for approximately one seventh of a cycle. Now as cams 847—1 to 847—7 sequentially close contacts 848—1 to 848—7, tongues 849 of energized storage relays 837—1 to 837—7 will provide a circuit over lead 851 on a full cycle basis, through jack 852 over lead 853 to the selector magnet 453 of the seven to five unit converter unit 603. The signals are now reconverted to five unit start-stop signals as explained which are generated by contacts 521—1 to 521—5 and repeated over line 854 to the outlying receiving station 802. It is, of course understood, that stations 801 and 802 may be located at the same site. It is now apparent the signals which occupied only seven sixteenths of a cycle have now been expanded into a full cycle signal. Such an expansion takes place at both the local and the distant station. Thus, signals may be simultaneously generated by opposite stations on a full cycle basis, compressed at each station to approximately one half of a transmitting cycle and expanded again to a full cycle after receipt by the opposite station. It will be understood that a suitable seven unit recorder could be operated by the continuous seven unit signals by providing an overlap signal storage arrangement to enable the printing and other functions to be performed. A seven unit printer is shown in the afore-mentioned Potts patent which is hereby incorporated by reference into the present specification.

Motor 12 is again phased by means of tuning fork 633 which now has a natural frequency of sixteen complete vibrations per cycle while cam 61 is now provided with sixteen lobes representative of the fourteen signal interval periods and the two idle interval periods. It is felt unnecessary to again repeat in detail the description of the method of phasing motor 12. Correcting impulses for the right-hand winding of relay 646 are now provided by operation of contact tongue 647 of receiving relay 832. As tongue 647 moves to its contact on receipt of a marking impulse, condenser 648 becomes charged and when the tongue 647 falls to its back contact on receipt of a spacing impulse, a pulsing circuit extends over lead 857 and through the right-hand winding of relay 646.

A finder arrangement similar to the one described in connection with the motor unit is used for phasing purposes. When it is desired to perform a phasing operation, a key 858 (Fig. 28) is operated together with a key 859 (Fig. 26). It is understood that the connections shown for both keys could be on the same key although the connections are shown separately for the purposes of description. Each time tongue 836 of receiving relay 832 falls against its back contact in response to a spacing signal, a circuit extends over lead 861 and through the winding of a repeating relay 862. Thus, contact tongues 863 and 864 of relay 862 are operated according to the incoming signals. Idle signals are again used for phasing purposes with cam 866 designed to operate contact pair 867 during the first, third, fourth, and sixth impulse periods and cam 868 designed to operate contact pair 869 during the second, fifth, and seventh impulse periods. All the impulses, of course, are now received during approximately one half of a revolution of sleeve 84A. If the apparatus is out of phase, a circuit will be completed from the contact tongue 864 of relay 862 for the left-hand winding of double wound relay 871, as was described in connection with the other systems. As relay 871 operates, it locks up through its right-hand winding contact tongue 872, contact pair 873 and key 858. Attraction of tongue 874 by relay 871 completes an obvious circuit for finder magnet 39 which functions as described in connection with the motor unit. After the apparatus has been brought into phase, relay 871 and finder magnet 39 become de-energized. Key 859 is provided so that the station performing the phasing operation will send an all marking signal to the opposite station. Thus, a station may be phased only by the idle signal received from the opposite station. Otherwise, a station might receive its own idle signals and become improperly phased. It is obvious that as long as key 859 is depressed, all storage relays 809—1 to 809—7 will be energized and the all marking signal will be transmitted.

Now to be described is an alarm system which is operable upon a failure of reception of signals. Suitably attached to cam sleeve 84A are the cams 881 and 882. Cam 881 has seven lobes which function to close contact pair 883 during the interval that incoming signals are received from the opposite station. As relay 862 repeats the incoming signals, contact tongue 863 is operated to make and break a circuit extending over lead 884, through contact pair 883 when closed and through the winding of relay 886. As relay 886 operates, it locks up through contact tongue 887 and contact pair 888, controlled by cam 882. Attraction of contact tongue 889 by relay 886 completes an obvious circuit for a slow to release relay 891. It is apparent that as long as signals are being received, relay 886 will operate during each cycle and be released by the opening of contact pair 888 by cam 882. Thus slow to release relay 886 will be continuously energized while signals are received. It should be remembered that there are always three marking impulses in the seven unit code. As long as relay 891 is operated, it attracts its contact tongue 892. However, should there be a signal failure, contact tongue 892 will fall away and close an obvious circuit extending over lead 893 to selector magnet 123 of converter unit 602. Thus, steady marking will be applied to the selector magnet 123, the start-stop selector will not be released, and transmitting station 801 will be blocked out. When slow to release relay 891 becomes de-energized, contact tongue 894 falls away and causes signal lamp 896 to become illuminated. Proper operational steps would then be taken, of course, to rectify any such failure of reception.

It will be understood that variations and modifications of the present invention may be made without departing from the inventive concept. It will be particularly understood that the last described system should not be necessarily limited to a single frequency transmission system but may have applications in other types of radio and wire systems.

What is claimed is:

1. In a telegraph conversion system, means for originating signal code combinations at a certain rate of speed, each representative of a start-stop and a series of equal length impulses, means for converting said code combinations into continuous code combinations composed of a series of equal length impulses greater in number than the equal length impulses of the first-mentioned code combinations, means for transmitting said continuous code combinations at a greater rate of speed than said signal combinations representative of a start-stop and equal length impulses are originated, means for compensating for said greater rate of transmission by automatically transmitting idle signals at predetermined intervals, means for receiving said continuous code combinations and said idle signals including means for deleting said idle signals, means for reconverting said continuous code combinations into the original code combinations having start-stop and equal length impulses, and recording means operable in response to the receipt of said reconverted signals.

2. In a telegraph conversion system, means for originating signal code combinations at a certain rate of speed, each representative of a start-stop and a series of equal length impulses, mechanical apparatus for converting said code combinations into continuous code combinations composed of a series of equal length impulses greater in number than the equal length impulses of the first-mentioned code combinations, means for transmitting said continuous code combinations at a greater rate of speed than said signal combinations representative of a start-stop and equal length impulses are originated, means for compensating for said greater rate of transmission by automatically transmitting idle signals at predetermined intervals, means for receiving said continuous code combinations and said idle signals including means for deleting said idle signals, mechanical apparatus for reconverting said continuous code combinations into the original code combinations having start-stop and equal length impulses, and recording means operable in response to the receipt of said reconverted signals.

3. In a telegraph conversion system, means for originating signal code combinations at a certain rate of speed, each representative of a start-stop and a series of equal length code impulses, mechanical apparatus for converting said code combinations into continuous code combinations composed of a series of equal length impulses greater in number than the equal length impulses of the first-mentioned code combinations, radio transmitting means for transmitting continuous code combinations at a greater rate of speed than said signal combinations representative of start-stop and equal length impulses are originated, means for compensating for said greater rate of transmission by automatically transmitting idle signals at predetermined intervals, radio receiving means for receiving said continuous code combinations and said idle signals including means for deleting said idle signals, mechanical apparatus for reconverting said continuous code combinations into the original code combinations having start-stop and equal length impulses, and recording means operable in response to the receipt of said reconverted signals.

4. In a telegraph conversion system, means for originating signal combinations at a certain rate of speed, each composed of start-stop and a series of equal length impulses, means for converting said code combinations into continuous code combinations, each composed only of a series of equal length impulses, means for transmitting said continuous code combinations at a greater rate of speed than said signal combinations composed of start-stop and equal length impulses are originated, means for compensating for said greater rate of transmission by automatically transmitting idle signals at predetermined intervals, each of said idle signals composed of equal length marking and spacing impulses of the same number as one of said continuous code combinations, means for receiving said continuous code combinations and said idle signals, means operated by said receiving means for deleting said idle signals, means for reconverting said continuous code combinations into the original code combinations having start-stop signals and equal length impulses, and recording means operable in response to the receipt of said reconverted signals.

5. In a telegraph conversion system, means for originating signal combinations at a certain rate of speed, each composed of start-stop and a series of equal length impulses, mechanical apparatus for converting said code combinations into continuous code combinations, each composed only of a series of equal length impulses, means for transmitting said continuous code combinations at a greater rate of speed than said signal combinations representative of start-stop and equal length impulses are originated, means for compensating for said greater rate of transmission by automatically transmitting idle signals at predetermined intervals, each of said idle signals composed of a continuous series of equal length marking and spacing impulses, means for receiving said continuous code combinations and said idle signals, means operable by said receiving means for deleting said idle signals, mechanical apparatus for reconverting said continuous code combinations into the original code combinations having start-stop signals and equal length impulses, and recording means operable in response to receipt of said reconverted signals.

6. In a telegraph conversion system, means for originating signal combinations at a certain rate of speed, each composed of start-stop and a series of equal length impulses, a set of code bars positioned in accordance with said series of equal length impulses, a second set of code bars of greater number than said first set, means to apply the setting of the first set of code bars to the second set, means controlled by the second set of code bars for transmitting a continuous code combination at a greater rate of speed than said signal code combinations composed of start-stop and equal length impulses, means for compensating for said greater rate of transmission by automatically transmitting idle signals at predetermined intervals, means for receiving said continuous code combinations and said idle signals, means operable by said receiving means for deleting said idle signals, means for reconverting said continuous code combinations into the original code combinations having start-stop signals and equal length impulses, and recording means operable in response to receipt of said reconverted signals.

7. In a telegraph conversion system, means for originating signal code combinations at a certain rate of speed, each having start-stop and a series of equal length impulses, means for converting said code combinations into continuous code combinations, each composed of a series of equal length impulses, means for transmitting said continuous code combinations at a greater rate of speed than said signal combinations having start-stop and equal length impulses, means for compensating for said greater rate of transmission by automatically transmitting idle signals at predetermined intervals, means for receiving said continuous code combinations, means operable by said receiving means for deleting said idle signals, a first set of code bars settable in accordance with said continuous code combinations, a second set of code bars, means to apply the code setting of said first set of code bars to the second set of code bars, means actuated in accordance with the setting of the second set of code bars for generating signal code combinations having start-stop and a series of equal length impulses as the signals originally generated, and recording means operable in response to the receipt of said reconverted signals.

8. In a telegraph conversion system, means for originating signal code combinations at a certain rate of speed, each representative of a start-stop and a series of equal length impulses, a first series of code bars each of which is settable in accordance with one of said original series of equal length impulses, a second set of code bars having more code bars therein than said first set, means to transfer the setting of the first set of code bars to the second set, means operable in accordance with the setting of the second set of code bars for transmitting a continuous series of equal length impulses at a greater rate of speed than said signal combinations representative of said start-stop and equal length impulses, each of said impulses being determined by the setting of one of said second set of code bars, means for compensating for said greater rate of transmission by automatically transmitting idle signals at predetermined intervals, means for receiving said continuous signals and said idle signals, means operable by said receiving means for deleting said idle signals, a third set of code bars each of which is actuated in accordance with the reception of one of said continuous signals, a fourth set of code bars less in number than said third set of code bars, means to apply the setting of the third set of code bars to the fourth set, recording means associated with said receiving means, and means to apply the setting of the fourth set of code bars to said recording means at a rate of speed equal to the speed of the original code combinations having a start-stop and a series of equal length impulses.

9. In a telegraph conversion system, means for originating signal code combinations at a certain rate of speed, each representative of a start-stop and a series of equal length impulses, a first rotatable member, a selector mechanism actuated by said series of equal length impulses for controlling the movement of said first rotatable member, a first group of code bars, means on the first rotatable member for selectively setting the position of the first group of code bars in conjunction with the operation of said selector mechanism, a second rotatable member, means to continuously rotate said second rotatable member, a second group of code bars greater in number than said first group, means to transfer the setting of the first group of code bars to the second group of code bars, means controlled by the movement of the second rotatable member and the setting of the second group of code bars for producing signal code combinations composed of a series of equal length impulses greater in number than the equal length impulses of the first mentioned code combinations, means for generating idle signals to compensate for the gain in movement of the second rotatable member over the first rotatable member, means for receiving said continuous code combinations and said idle signals, means operable by said receiving means for deleting said idle signals, means for reconverting said continuous code combinations into the original code combinations having start-stop and equal length impulses, and recording means operable in response to the receipt of said reconverted signals.

10. In a telegraph conversion system, means for originating said signal code combinations at a certain rate of speed, each representative of a start-stop and a series of equal length code impulses, means for converting said code combinations into continuous code combinations composed of a series of equal length impulses greater in number than the equal length impulses of the first mentioned code combinations, transmitting means for transmitting the continuous code combinations at a greater rate of speed than said signal combinations representative of a start-stop and a series of equal length impulses, means for compensating for said greater rate of speed by automatically transmitting idle signals at predetermined intervals, a solenoid operable in response to said continuous code combinations and said idle signals, a first rotatable member, a first group of code bars, means carried by the first rotatable means operable in conjunction with said receiving means for setting said first group of code bars, a second group of code bars of less number than said first group, means to transfer the setting of the first group of code bars to the second group of code bars, a second rotatable means operable in conjunction with the setting of the second set of code bars for reconverting the continuous code combinations into the original start-stop and series of equal length impulses, selective means controlled by the first rotatable means for controlling the rotation of the second rotatable means, means to render said control means ineffective to prevent the rotation of the second rotatable means upon reception of an idle signal by the receiving means, and recording means actuated by said reconverted signals having start-stop and a series of equal length impulses.

11. In a telegraph conversion system, means for originating signal combinations at a certain rate of speed, each composed of start-stop and a series of equal length impulses, mechanical apparatus for converting said code combinations into continuous code combinations each composed only of a series of equal length impulses, a selector magnet operable by said series of equal length impulses for operating said mechanical apparatus, means for transmitting said continuous code combinations at a greater rate of speed than said signal combinations representative of a start-stop and a series of equal length impulses, mechanical means for continually operating said transmitting means, means operated in accordance with the gains of the continually operable means over the intermittently operable means for automatically transmitting idle signals at predetermined intervals, continually operable means for receiving said continuous code combinations and said idle signals, intermittently operated means operable in response to the reception of a continuous code combination in the continually operable means for reconverting said continuous code combination into start-stop and a series of equal length impulses, recording means connected with said intermittently operable means for operation upon receipt of said reconverted signals, and means operable upon reception of an idle signal for precluding the operation of said last mentioned intermittently operable means to prevent the operation of the recording means.

MARTHA W. C. POTTS,

*Executrix Under the Last Will and Testament of Louis M. Potts, Deceased.*

REFERENCES CITED

The following references are of record in the file of this patent:

UNITED STATES PATENTS

| Number | Name | Date |
|---|---|---|
| 1,880,906 | Duerr et al. | Oct. 4, 1932 |
| 2,105,897 | Towne | Jan. 18, 1938 |
| 2,152,772 | Potts | Apr. 4, 1939 |
| 2,155,882 | Adams | Apr. 25, 1939 |
| 2,252,032 | Redd | Aug. 12, 1941 |
| 2,279,353 | Van Duuren | Apr. 14, 1942 |
| 2,309,222 | Spencer | Jan. 26, 1943 |
| 2,351,137 | Long | June 13, 1944 |
| 2,354,534 | Mason | July 25, 1944 |
| 2,404,565 | Bumstead | July 23, 1946 |
| 2,459,904 | Watson | Jan. 25, 1949 |